United States Patent
Yang et al.

(10) Patent No.: US 11,916,672 B2
(45) Date of Patent: Feb. 27, 2024

(54) FEEDBACK ERROR HANDLING FOR WIRELESS SYSTEMS

(71) Applicant: QUALCOMM Incorporated, San Diego, CA (US)

(72) Inventors: Ming Yang, San Diego, CA (US); Kausik Ray Chaudhuri, San Diego, CA (US); Juan Montojo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 337 days.

(21) Appl. No.: 17/475,943

(22) Filed: Sep. 15, 2021

(65) Prior Publication Data
US 2022/0094476 A1  Mar. 24, 2022

Related U.S. Application Data

(60) Provisional application No. 63/080,202, filed on Sep. 18, 2020.

(51) Int. Cl.
*H04L 1/00* (2006.01)
*H04L 1/1812* (2023.01)
*H04L 5/00* (2006.01)
*H04W 72/20* (2023.01)

(52) U.S. Cl.
CPC .......... *H04L 1/0072* (2013.01); *H04L 1/1812* (2013.01); *H04L 5/0055* (2013.01); *H04W 72/20* (2023.01)

(58) Field of Classification Search
CPC ... H04L 1/0072; H04L 1/1812; H04L 5/0055; H04L 1/001; H04L 1/0026; H04L 1/1664; H04L 2001/125; H04L 1/1671; H04W 72/20
See application file for complete search history.

(56) References Cited

U.S. PATENT DOCUMENTS

| | | | | |
|---|---|---|---|---|
| 2003/0202500 A1* | 10/2003 | Ha | .......... | H04L 1/1692 370/335 |
| 2007/0086422 A1* | 4/2007 | Kim | ...... | H04L 1/1812 370/349 |
| 2007/0168826 A1* | 7/2007 | Terry | ..... | H04L 1/1812 714/748 |

(Continued)

*Primary Examiner* — Edan Orgad
*Assistant Examiner* — Malick A Sohrab
(74) *Attorney, Agent, or Firm* — Arun Swain

(57) ABSTRACT

Methods, systems, and devices for wireless communications are described. A user equipment (UE) may receive a feedback error configuration indicating an error threshold associated with a feedback error type of a set of feedback error types, and a time window for feedback error detection per frequency band combination. The UE may detect one or multiple feedback errors for the feedback error type within the time window, and determine that a number of the one or multiple feedback errors for the feedback error type exceeds the error threshold. The UE may transmit a feedback error indication based on the determination that the number of the detected one or multiple feedback errors exceeds the error threshold. The feedback error indication may include an indication of the one or multiple feedback errors and the feedback error type associated with the one or multiple feedback errors.

30 Claims, 18 Drawing Sheets

(56) References Cited

U.S. PATENT DOCUMENTS

| | | | |
|---|---|---|---|
| 2007/0177630 A1* | 8/2007 | Ranta | H04L 1/1829 |
| | | | 370/428 |
| 2008/0022180 A1* | 1/2008 | Kuo | H04L 1/188 |
| | | | 714/748 |
| 2008/0043619 A1* | 2/2008 | Sammour | H04L 1/187 |
| | | | 370/231 |
| 2010/0257419 A1* | 10/2010 | Sung | H04W 72/23 |
| | | | 714/E11.131 |
| 2010/0275087 A1* | 10/2010 | Doppler | H04L 1/1809 |
| | | | 714/748 |
| 2012/0099491 A1* | 4/2012 | Lee | H04L 1/0015 |
| | | | 370/280 |
| 2020/0059327 A1* | 2/2020 | Kini | H04L 43/06 |
| 2021/0391954 A1* | 12/2021 | Kwak | H04L 5/0055 |

* cited by examiner

FEEDBACK ERROR HANDLING FOR WIRELESS SYSTEMS

CROSS REFERENCE

The present application for patent claims the benefit of U.S. Provisional Patent Application No. 63/080,202 by YANG et al., entitled "FEEDBACK ERROR HANDLING FOR WIRELESS SYSTEMS," filed Sep. 18, 2020, assigned to the assignee hereof, and expressly incorporated by reference herein.

FIELD OF TECHNOLOGY

The following relates to wireless communications, including feedback error handling for wireless systems.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM).

A wireless multiple-access communications system may include one or more base stations or one or more network access nodes, each simultaneously supporting communication for multiple communication devices, which may be otherwise known as user equipment (UE). In the wireless multiple-access communications system, some communication devices may support a feedback mechanism (e.g., a hybrid automatic repeat request (HARD) feedback) to increase a reliability and decrease a latency for wireless communication (e.g., downlink reception, uplink transmission). In some cases, these communication devices may incorrectly decode feedback (e.g., a positive acknowledgment (ACK), a negative acknowledgment (NACK)). As a result, these communication devices may miss retransmissions or perform unnecessary retransmissions. This may result in a decrease in throughput, an increase in latency, and a decrease in reliability in the wireless multiple-access communications system.

SUMMARY

Various aspects of the present disclosure relate to configuring a communication device, such as a UE and a base station, for example, an eNodeB (eNB), a next-generation NodeB or a giga-NodeB (either of which may be referred to as a gNB) of wireless communication system to support feedback error handling (e.g., ACK/NACK error handling). For example, the UE may be configured to detect a feedback signal error based on a comparison of an expected transmission to an actual transmission. The UE may be configured to monitor a level of detected feedback signal errors, a type of detected feedback error, or any combination of the level and the type of feedback signal errors. In some cases, if the level or the type of detected feedback signal errors exceeds a threshold, the UE may be configured to transmit an indication of feedback signal errors to the base station.

The UE may also be configured to indicate one or more preferred transmission parameters based on one or more detected feedback signal errors. The base station may be configured to retransmit one or more transmissions to the UE based on an indication of one or more feedback signal errors from the UE. The base station may also change the configuration of one or more transmission parameters for wireless communications with the UE based on the received indication(s). By handling feedback errors, the UE may decrease power consumption. The present disclosure may, as a result, also include improvements to data throughput, spectral efficiency and, in some examples, may promote high reliability and low latency wireless communications (e.g., downlink reception, uplink transmission), among other benefits.

A method of wireless communications at a UE is described. The method may include receiving, from a base station, a feedback error configuration indicating at least one error threshold associated with at least one feedback error type of a plurality of feedback error types and at least one time window for feedback error detection per frequency band combination, detecting one or more feedback errors for the at least one feedback error type within the at least one time window, and transmitting, to the base station, a feedback error indication based on a number of the one or more feedback errors exceeding the at least one error threshold, where the feedback error indication includes an indication of the one or more feedback errors and the at least one feedback error type associated with the one or more feedback errors.

An apparatus for wireless communications is described. The apparatus may include a processor, memory coupled with the processor, and instructions stored in the memory. The instructions may be executable by the processor to cause the apparatus to receive, from a base station, a feedback error configuration indicating at least one error threshold associated with at least one feedback error type of a plurality of feedback error types and at least one time window for feedback error detection per frequency band combination, detect one or more feedback errors for the at least one feedback error type within the at least one time window, and transmit, to the base station, a feedback error indication based on a number of the one or more feedback errors exceeding the at least one error threshold, where the feedback error indication includes an indication of the one or more feedback errors and the at least one feedback error type associated with the one or more feedback errors.

Another apparatus for wireless communications is described. The apparatus may include means for receiving, from a base station, a feedback error configuration indicating at least one error threshold associated with at least one feedback error type of a plurality of feedback error types and at least one time window for feedback error detection per frequency band combination, detecting one or more feedback errors for the at least one feedback error type within the at least one time window, and transmitting, to the base station, a feedback error indication based on a number of the one or more feedback errors exceeding the at least one error threshold, where the feedback error indication includes an indication of the one or more feedback errors and the at least one feedback error type associated with the one or more feedback errors.

A non-transitory computer-readable medium storing code for wireless communications at a UE is described. The code may include instructions executable by a processor to receive, from a base station, a feedback error configuration indicating at least one error threshold associated with at least one feedback error type of a plurality of feedback error types and at least one time window for feedback error detection per frequency band combination, detect one or more feedback errors for the at least one feedback error type within the at least one time window, and transmit, to the base station, a feedback error indication based on a number of the one or more feedback errors exceeding the at least one error threshold, where the feedback error indication includes an indication of the one or more feedback errors and the at least one feedback error type associated with the one or more feedback errors.

Some examples of the method, apparatuses, and non-transitory computer-readable medium described herein may further include operations, features, means, or instructions for determining a UE preference for one or more transmission parameters based on the number of the one or more feedback errors for the at least one feedback error exceeding the at least one error threshold, where the feedback error indication includes an indication of the one or more transmission parameters.

In some examples of the method, apparatuses, and non-transitory computer-readable medium described herein, determining the UE preference for one or more transmission parameters may include operations, features, means, or instructions for determining a coding rate for acknowledgment (ACK) negative ACK (NACK) feedback and channel state information (CSI) in a physical uplink shared channel (PUSCH), an ACK/NACK feedback and CSI repetition configuration in one or both of the PUSCH or a physical uplink control channel (PUCCH), a resource partition configuration between uplink control information (UCI) and data in the PUSCH, a preference to drop one or more CSI parts or data in the PUSCH, or a power offset between ACK/NACK feedback, a CSI, and data in the PUSCH, or any combination thereof.

Some examples of the method, apparatuses, and non-transitory computer-readable medium described herein may further include operations, features, means, or instructions for transmitting an ACK feedback message based on a successful reception of a data transmission, and receiving a retransmission of the data transmission after transmitting the ACK feedback message within the at least one time window, where the one or more feedback errors for the at least one feedback error may be detected based at least in part on the received retransmission of the data transmission in response to the transmitted ACK feedback message.

Some examples of the method, apparatuses, and non-transitory computer-readable medium described herein may further include operations, features, means, or instructions for determining that the at least one feedback error type associated with the one or more feedback errors may be an ACK to NACK error based on the received retransmission of the data transmission in response to the transmitted ACK feedback message.

Some examples of the method, apparatuses, and non-transitory computer-readable medium described herein may further include operations, features, means, or instructions for transmitting a NACK feedback message based on an unsuccessful reception of a first data transmission, and receiving, after transmitting the NACK feedback message, a second data transmission different from the first data transmission within the at least one time window, where the one or more feedback errors for the at least one feedback error may be detected based at least in part on the received second data transmission in response to the transmitted NACK feedback message.

Some examples of the method, apparatuses, and non-transitory computer-readable medium described herein may further include operations, features, means, or instructions for determining that the at least one feedback error type associated with the one or more feedback errors may be a NACK to ACK error based on the received second data transmission in response to the transmitted NACK feedback message.

In some examples of the method, apparatuses, and non-transitory computer-readable medium described herein, transmitting the feedback error indication may include operations, features, means, or instructions for transmitting the feedback error indication semi-statically based on the at least one feedback error type including an ACK to NACK error.

In some examples of the method, apparatuses, and non-transitory computer-readable medium described herein, transmitting the feedback error indication semi-statically may include operations, features, means, or instructions for transmitting the feedback error indication via radio resource control (RRC) signaling.

In some examples of the method, apparatuses, and non-transitory computer-readable medium described herein, transmitting the feedback error indication may include operations, features, means, or instructions for transmitting the feedback error indication dynamically based on the feedback error type including a NACK to ACK error.

In some examples of the method, apparatuses, and non-transitory computer-readable medium described herein, transmitting the feedback error indication dynamically may include operations, features, means, or instructions for transmitting the feedback error indication via a CSI or a medium access control (MAC) control element (MAC-CE), or both.

Some examples of the method, apparatuses, and non-transitory computer-readable medium described herein may further include operations, features, means, or instructions for determining a first error threshold for a first feedback error type and a second error threshold for a second feedback error type based on the feedback error configuration, where the feedback error indication indicates the first feedback error type based on the one or more feedback errors being associated with the first feedback error type and the number of the one or more feedback errors exceeds the first error threshold or the feedback error indication indicates the second feedback error type based on the one or more feedback errors being associated with the second feedback error type and the number of the one or more feedback errors exceeds the second error threshold.

In some examples of the method, apparatuses, and non-transitory computer-readable medium described herein, the first feedback error type includes an ACK to NACK error type and the second feedback error type includes a NACK to ACK error type, and the first error threshold may be greater than the second error threshold.

In some examples of the method, apparatuses, and non-transitory computer-readable medium described herein, receiving the feedback error configuration may include operations, features, means, or instructions for receiving the feedback error configuration per frequency band combination via RRC signaling.

In some examples of the method, apparatuses, and non-transitory computer-readable medium described herein, transmitting the feedback error indication may include operations, features, means, or instructions for transmitting the feedback error indication via an RRC signaling, a MAC-CE signaling, a CSI, or any combination thereof.

Some examples of the method, apparatuses, and non-transitory computer-readable medium described herein may further include operations, features, means, or instructions for receiving a reconfiguration message that indicates a resource partition change or a power offset modification, or both, in response to the transmitted feedback error indication.

A method of wireless communications at a base station is described. The method may include transmitting, to a UE, a feedback error configuration indicating at least one error threshold associated with a feedback error type of a plurality of feedback error types and at least one time window for feedback error detection at the UE, transmitting a data message to the UE, and receiving, from the UE, a feedback error indication indicating one or more feedback errors detected by the UE and the feedback error type associated with the one or more feedback errors.

An apparatus for wireless communications at a base station is described. The apparatus may include a processor, memory coupled with the processor, and instructions stored in the memory. The instructions may be executable by the processor to cause the apparatus to transmit, to a UE, a feedback error configuration indicating at least one error threshold associated with a feedback error type of a plurality of feedback error types and at least one time window for feedback error detection at the UE, transmit a data message to the UE, and receive, from the UE, a feedback error indication indicating one or more feedback errors detected by the UE and the feedback error type associated with the one or more feedback errors.

Another apparatus for wireless communications at a base station is described. The apparatus may include means for transmitting, to a UE, a feedback error configuration indicating at least one error threshold associated with a feedback error type of a plurality of feedback error types and at least one time window for feedback error detection at the UE, transmitting a data message to the UE, and receiving, from the UE, a feedback error indication indicating one or more feedback errors detected by the UE and the feedback error type associated with the one or more feedback errors.

A non-transitory computer-readable medium storing code for wireless communications at a base station is described. The code may include instructions executable by a processor to transmit, to a UE, a feedback error configuration indicating at least one error threshold associated with a feedback error type of a plurality of feedback error types and at least one time window for feedback error detection at the UE, transmit a data message to the UE, and receive, from the UE, a feedback error indication indicating one or more feedback errors detected by the UE and the feedback error type associated with the one or more feedback errors.

Some examples of the method, apparatuses, and non-transitory computer-readable medium described herein may further include operations, features, means, or instructions for determining that the feedback error type associated with the one or more feedback errors may be an ACK to NACK error based on the feedback error indication, modifying one or more transmission parameters at the base station based on the feedback error type including the ACK to NACK error, and transmitting, to the UE, a second data transmission based on the modified one or more transmission parameters.

Some examples of the method, apparatuses, and non-transitory computer-readable medium described herein may further include operations, features, means, or instructions for determining that the feedback error type associated with the one or more feedback errors may be a NACK to ACK error based on the feedback error indication, and transmitting a retransmission of the data transmission to the UE based on the feedback error type including the NACK to ACK error.

Some examples of the method, apparatuses, and non-transitory computer-readable medium described herein may further include operations, features, means, or instructions for determining a UE preference for one or more transmission parameters based on the received feedback error indication, modifying a set of transmission parameters at the base station based on the UE preference for one or more transmission parameters, and transmitting, to the UE, an indication of the modified set of transmission parameters.

Some examples of the method, apparatuses, and non-transitory computer-readable medium described herein may further include operations, features, means, or instructions for determining a coding rate for ACK NACK feedback and CSI in a PUSCH, an ACK/NACK feedback and CSI repetition configuration in one or both of the PUSCH or a PUCCH, a resource partition configuration between UCI and data in the PUSCH, a preference to drop one or more CSI parts or data in the PUSCH, or a power offset between ACK/NACK feedback, a CSI, and data in the PUSCH, or any combination thereof.

Some examples of the method, apparatuses, and non-transitory computer-readable medium described herein may further include operations, features, means, or instructions for modifying a set of transmission parameters at the base station based on the feedback error indication, where the set of transmission parameters includes a resource partition, a power offset, or any combination thereof, and transmitting a reconfiguration message that indicates a resource partition change or a power offset modification, or both, based on the modifying.

In some examples of the method, apparatuses, and non-transitory computer-readable medium described herein, receiving the feedback error indication may include operations, features, means, or instructions for receiving the feedback error indication semi-statically based on the feedback error type being a NACK to ACK error.

In some examples of the method, apparatuses, and non-transitory computer-readable medium described herein, the feedback error indication may be received via RRC signaling.

In some examples of the method, apparatuses, and non-transitory computer-readable medium described herein, receiving the feedback error indication may include operations, features, means, or instructions for receiving the feedback error indication dynamically based on the feedback error type being a NACK to ACK error.

In some examples of the method, apparatuses, and non-transitory computer-readable medium described herein, the feedback error indication may be received via a CSI or a MAC-CE, or both.

Some examples of the method, apparatuses, and non-transitory computer-readable medium described herein may further include operations, features, means, or instructions for determining a first error threshold for a first feedback error type and a second error threshold for a second feedback error type based on the feedback error configuration, where the feedback error configuration includes the first error threshold and the second error threshold.

In some examples of the method, apparatuses, and non-transitory computer-readable medium described herein, the feedback error indication indicates the first feedback error type based on the one or more feedback errors being associated with the first feedback error type and a number of the one or more feedback errors exceeding the first error threshold or the feedback error indication indicates the second feedback error type based on the one or more feedback errors being associated with the second feedback error type and the number of the one or more feedback errors exceeding the second error threshold.

In some examples of the method, apparatuses, and non-transitory computer-readable medium described herein, the first feedback error type includes an ACK to NACK error type and the second feedback error type includes a NACK to ACK error type, and the first error threshold may be greater than the second error threshold.

In some examples of the method, apparatuses, and non-transitory computer-readable medium described herein, transmitting the feedback error configuration may include operations, features, means, or instructions for transmitting the feedback error configuration via RRC signaling.

DETAILED DESCRIPTION

Figure 1:
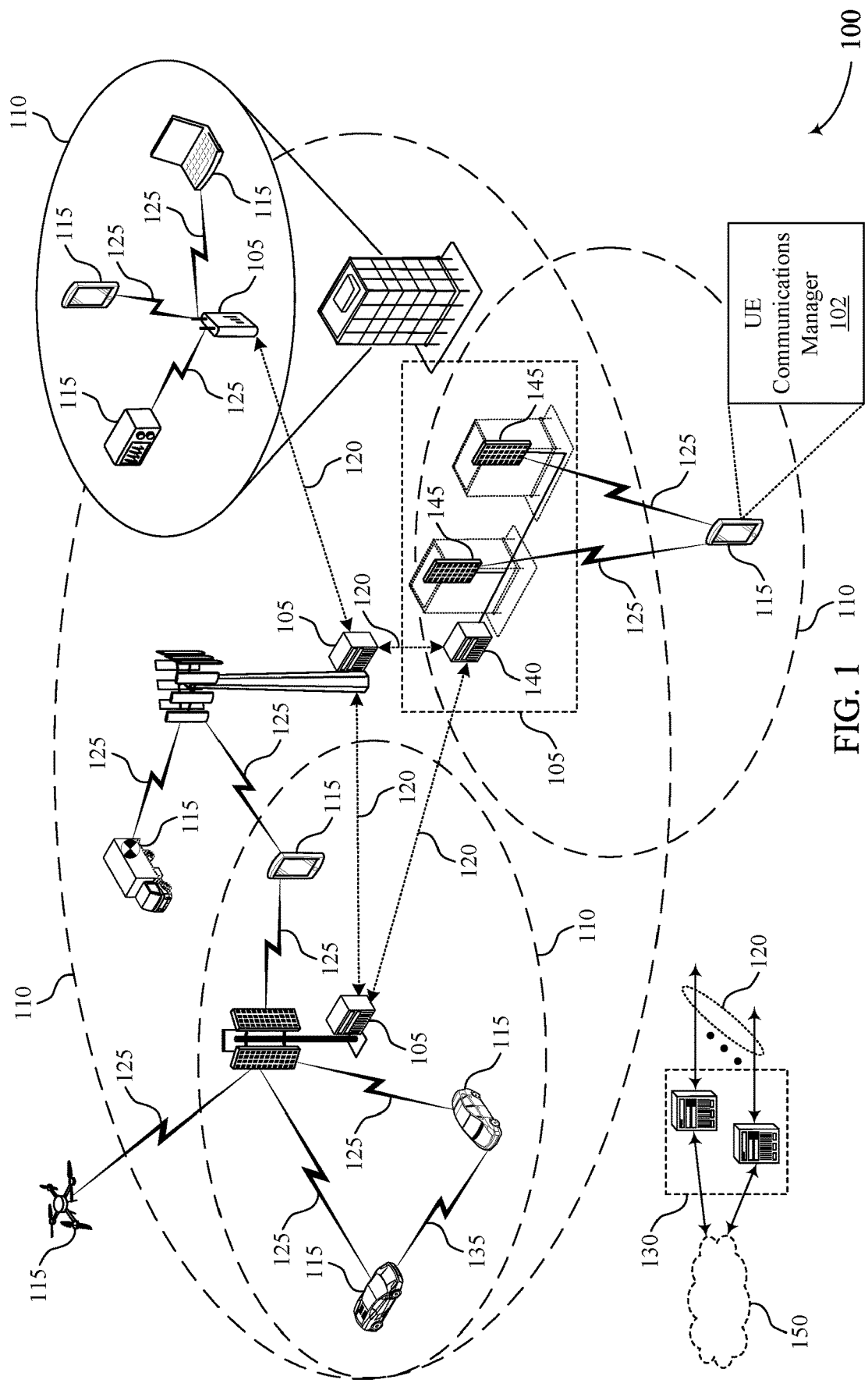
FIGS. 1 and 2 illustrates examples of wireless communications systems in accordance with aspects of the present disclosure.

Some wireless communication systems may include communication devices, such as UEs and base stations, for example, eNBs, gNBs that may support multiple radio access technologies. Examples of radio access technologies include 4G systems such as LTE systems and 5G systems which may be referred to as NR systems. A base station or a UE, or both, may support retransmission of control information or data, or both, to increase a likelihood that the control information or the data, or both, is received successfully. In some cases, retransmission of the control information or the data, or both, may be based on a feedback message (also referred to as a feedback signal) transmitted by, for example, the base station to the UE or the UE to the base station, or both. For example, a UE may transmit a NACK feedback signal to the base station, to indicate that the UE did not successfully receive a transmission (e.g., control information, data), and the base station may retransmit the transmission based on receipt of the NACK feedback signal. In some cases, the base station or the UE, or both, may experience feedback signal errors, which may result in the base station or the UE, or both, failing to detect feedback signal errors. For example, the base station may decode a NACK feedback signal when the UE actually transmitted an ACK feedback signal. In some cases, the feedback signal errors may result in not transmitting a necessary retransmission or transmitting an unnecessary retransmission, resulting in decreased throughput, increased latency, and decreased user experience.

Various aspects of the present disclosure relate to configuring a UE to support feedback signal error detection and error handling. The UE may be configured to detect a feedback signal error based on a comparison of an expected transmission to an actual transmission received in response to a feedback signal. The UE may be configured to monitor a level of detected feedback signal errors, a type of detected feedback error, or any combination of the level and the type of feedback signal errors. If the level or the type of detected feedback signal errors exceeds a threshold, the UE may be configured to provide an indication of feedback signal errors to the base station. The UE may also be configured to indicate one or more preferred transmission parameters to the base station based on one or more detected feedback signal errors. The base station may retransmit one or more downlink transmissions to the UE based on receiving an indication of one or more feedback signal errors from the UE. The base station may also change the configuration of one or more transmission parameters for communications with the UE based on the received indication or indications.

Aspects of the subject matter described in this disclosure may be implemented to realize one or more of the following potential improvements, among others. The techniques employed by the UE may provide benefits and enhancements to the operation of the UE. For example, operations performed by the UE may provide power saving improvements to the UE. In some examples, configuring the UE to handle feedback error (e.g., ACK/NACK error) may reduce power consumption by the UE. In some other examples, configuring the UE to handle the feedback error (e.g., ACK/NACK error) may promote higher reliability and lower latency wireless communications operations (e.g., reception and/or transmission of control information and data), among other benefits.

Aspects of the disclosure are initially described in the context of wireless communications systems. Aspects of the disclosure are further illustrated by and described with reference to apparatus diagrams, system diagrams, and flowcharts that relate to feedback error handling for wireless systems.

FIG. 1 illustrates an example of a wireless communications system 100 in accordance with aspects of the present disclosure. The wireless communications system 100 may include one or more base stations 105, one or more UEs 115, and a core network 130. In some examples, the wireless communications system 100 may be an LTE network, an LTE-Advanced (LTE-A) network, an LTE-A Pro network, or an NR network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links. One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples. The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode). A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing (Δf) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs. The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation. A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers. In some examples, a carrier may support multiple cells, and different cells may be configured according to different protocol types (e.g., MTC, narrowband IoT (NB-IoT), enhanced mobile broadband (eMBB)) that may provide access for different types of devices.

A base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, in the range of 300 megahertz (MHz) to 300 gigahertz (GHz). The region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally, or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

The base station 105 and the UE 115 may support a feedback mechanism (e.g., a HARQ mechanism) to increase the reliability of wireless communications between the base station 105 and the UE 115, or between the UE 115 and another UE 115. For example, when a base station 105 transmits one or more packets carrying control information or data to a UE 115, the UE 115 may send feedback information to the base station 105 about the reception status of the one or more packets, such as an indication of whether the one or more packets were successfully decoded. This type of feedback information may be referred to as a feedback message (e.g., a HARQ feedback message). In some cases, a UE 115 may send an ACK feedback to the base station 105 to indicate that the transmitted one or more packets were successfully decoded at the UE 115. In other cases, the UE 115 may send a NACK feedback to the base station 105 to indicate that the transmitted one or more packets were not successfully decoded.

In some cases, a base station 105 may experience errors in decoding a HARQ feedback message. The errors may be due to inter-symbol interference, inter-user interference, low signal to noise ratio, data collisions, etc. The base station 105 may be unable to detect one or more HARQ feedback errors. Various aspects of the described techniques relate to configuring a UE 115 to provide power saving improvements by handling feedback errors (e.g., HARQ feedback errors). For example, a UE 115, via a UE communication manager 102, may be configured to detect a HARQ feedback signal error based on a comparison of an expected transmission to an actual transmission received in response to a HARQ feedback signal.

For example, a UE 115 may, via the UE communication manager 102, transmit an ACK feedback signal in response to receiving and decoding a first transmission from a base station 105, but the base station 150 may retransmit the first transmission in response to receiving the feedback signal. In this example, the UE 115 may expect the base station 105 to transmit a second transmission, and the UE may thereby determine that a HARQ feedback error occurred. This feedback error may be considered an ACK-to-NACK feedback error. In another example, a UE 115 may, via the UE communication manager 102, transmit a NACK feedback signal in response to a failure to decode a first transmission from the base station 105, but the base station 105 may transmit a second transmission in response to receiving the feedback signal (i.e., the base station does not retransmit the first downlink transmission). In this example, the UE 115 may expect the base station 105 to retransmit the first transmission, and the UE may thereby determine that a HARQ feedback error occurred. This feedback error may be considered a NACK-to-ACK feedback error. The UE 115 may be configured to determine, via the UE communication manager 102, transmit dynamically (e.g., a MAC-CE message) or semi-statically (e.g., an RRC message) an indication of HARQ feedback error and an indication of preferred transmission parameters semi-statically or dynamically.

Therefore, by handling feedback errors, the UE 115 may decrease power consumption. The wireless communication system 100 may, as a result, also include improvements to data throughput, spectral efficiency and, in some examples, may promote high reliability and low latency wireless communications (e.g., downlink reception, uplink transmission), among other benefits.

Figure 2:
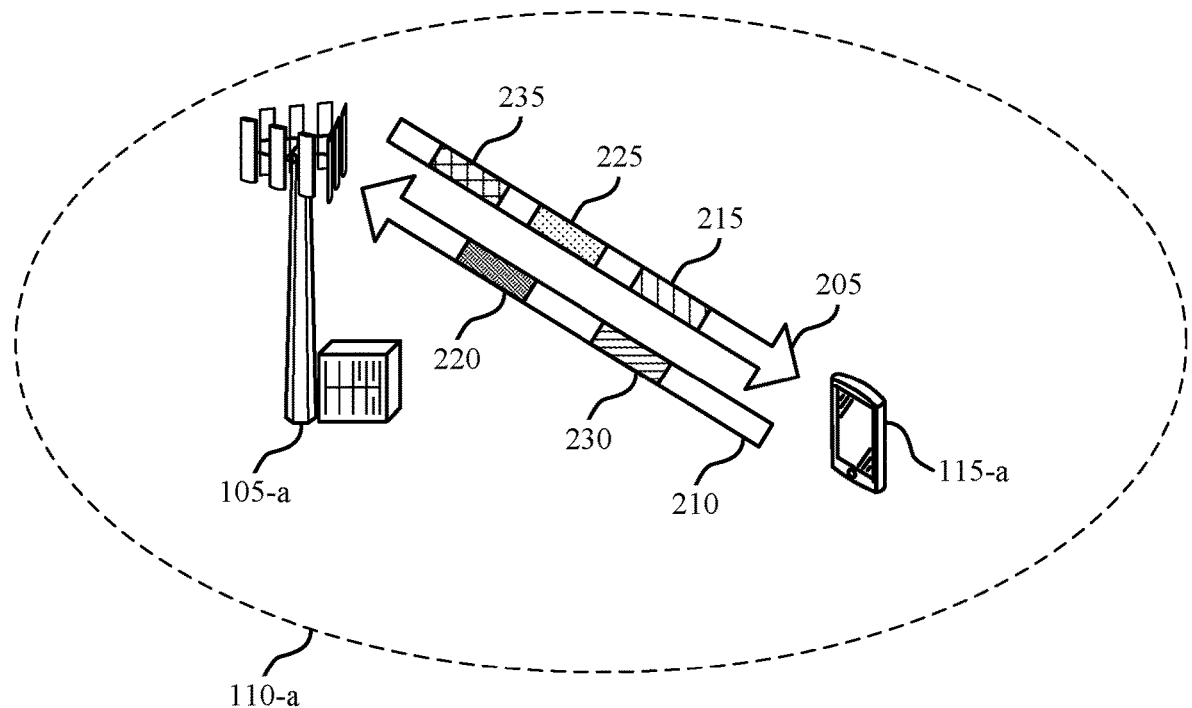

FIG. 2 illustrates an example of a wireless communications system 200 in accordance with aspects of the present disclosure. The wireless communications system 200 may implement aspects of the wireless communications system 100. For example, the wireless communications system 200 may include a base station 105-*a* and a UE 115-*a*, which may be examples of a base station 105 and a UE 115 as described herein. The wireless communications system 200 may support multiple radio access technologies including 4G systems such as LTE systems, LTE-A systems, or LTE-A Pro systems, and 5G systems, which may be referred to as NR systems. The wireless communications system 200 may include features for improvements to power savings and, in some examples, may promote high reliability and low latency downlink reception and uplink transmissions for power saving, among other benefits.

In the example of FIG. 2, the base station 105-*a* and the UE 115-*a* may communicate with one another via a communication link 205 and a communication link 210, which may be examples of a communication link 135 as described with reference to FIG. 1. The base station 105-*a* and the UE 115-*a* may support a feedback error handling method to increase a reliability of downlink and uplink communications between the base station 105-*a* and the UE 115-*a*. The base station 105-*a* may, in some examples, configure the UE 115-*a* with a configuration (also referred to as a feedback error configuration) that defines one or more feedback error thresholds and one or more time windows (e.g., symbols, slots), which may be used by the UE 115-*a* to determine whether to transmit a feedback error indication to the base station 105-*a*. For example, the UE 115-*a* may transmit a feedback error indication 230, via an uplink transmission, based at least in part on one or more parameters exceeding the one or more feedback error thresholds.

A feedback error threshold (also referred to as a threshold) may be a number of detected feedback errors, a rate of detected feedback errors, or a feedback error type, or any combination thereof. In some examples, the UE 115-*a* may determine a number of detected feedback errors and transmit the feedback error indication 230 based at least in part on the determined number of detected feedback errors satisfying a threshold (e.g., a number of detected feedback error threshold). In some other examples, the UE 115-*a* may determine a rate of detected feedback errors and transmit the feedback error indication 230 based at least in part on the determined a rate of detected feedback errors satisfying a threshold (e.g., a rate of detected feedback errors threshold). In other examples, the UE 115-*a* may determine a feedback error type and transmit the feedback error indication 230 based at least in part on the determined feedback error type corresponding to a particular feedback error type.

In the example of FIG. 2, the feedback error thresholds may be statically, semi-statically, or dynamically configured. In some cases, the one or more feedback error thresholds may be based at least in part on a radio access technology (RAT) environment (e.g., enhanced mobile broadband (eMBB), fixed wireless access (FWA), or ultra-reliable low-latency communications (URLLC)). In some other cases, the one or more feedback error thresholds may be based at least in part on UE capability. For example, one or more feedback error thresholds may be based at least in part the UE 115-*a* capability to tolerate feedback errors or a system priority. In some cases, the UE 115-*a* may use a first feedback error threshold for a first type of feedback error and a second feedback error threshold for a second type of feedback error. The first feedback error threshold and the second feedback error threshold may be different. For example, the UE 115-*a* may be configured to use a higher threshold for a first type of feedback error than for a second type of feedback error, so that the UE 115-*a* may allow a higher rate of the first type of feedback error than the second type of feedback error before transmitting an indication of a feedback error to the base station 105-*a*.

The base station 105-*a* may transmit a first downlink transmission 215 to the UE 115-*a*, which may include first control information or first data, or both. In response to the first downlink transmission 215, the UE 115-*a* may transmit a feedback message 220 to the base station 105-*a* to indicate whether or not the first downlink transmission 215 was successfully received and decoded at the UE 115-*a*. In some cases, the UE 115-*a* may transmit an ACK feedback indication in the feedback message 220 based on successfully decoding the first downlink transmission 215. In other cases, the UE 115-*a* may transmit a NACK feedback indication in the feedback message 220 based on a failure of decoding the first downlink transmission 215.

The base station 105-*a* and the UE 115-*a* may support retransmission of downlink communications based on a result of decoding the downlink communications at the UE 115-*a*. For example, the base station 105-*a* may receive, from the UE 115-*a*, the feedback message 220 and transmit a second downlink transmission 225 based at least in part on the received feedback message 220. In the event that the base station 105-*a* receives an ACK feedback indication in the feedback message 220, the base station 105-*a* may transmit other second control information or second data, or both, via the second downlink transmission 225 to the UE 115-*a*. Alternatively, in the event that the base station 105-*a* receives a NACK feedback indication in the feedback message 220, the base station 105-*a* may retransmit the first control information or the first data, or both, in the second downlink transmission 225 to the UE 115-*a*.

The base station 105-*a* may, in some cases, experience one or more errors in receiving and decoding the feedback message 220. This error may be referred to as a feedback error. In some cases the errors may be due to inter-symbol interference, inter-user interference, low signal to noise ratio, data collisions, etc. In some cases, the base station 105-*a* may be unable to detect the feedback error. For instance, the UE 115-*a* may transmit an ACK feedback indication in the feedback message 220, but the base station 105-*a* may decode a NACK feedback indication. This may be referred to as an ACK-to-NACK feedback error. In other examples, the UE 115-*a* may transmit a NACK feedback indication in the feedback message 220, but the base station 105-*a* may decode an ACK feedback indication. This may be referred to as a NACK-to-ACK feedback error.

A feedback error may be classified, categorized, filtered, sorted, etc. based on a feedback error type of the feedback error. For example, the UE 115-*a* may categorize a detected feedback error into a particular feedback error type. In some examples, the UE 115-*a* may assign a first type of feedback error (e.g., Type 1 feedback error) to an ACK-to-NACK feedback error. In some examples, the UE 115-*a* may assign a second type of feedback error (e.g., Type 2 feedback error) to a NACK-to-ACK feedback error. Based on detecting a feedback error, the UE 115-*a* may perform one or more operations according to a feedback error type (e.g., a Type 1 feedback error, a Type 2 Feedback error, or both) associated with the detected feedback error.

In response to an ACK-to-NACK feedback error, the base station 105-*a* may retransmit the first control information or the first data, or both, in the second downlink transmission 225. The UE 115-*a* may determine a presence of a feedback error based at least in part on receiving the retransmission of the first control information or the first data, or both, after transmitting an ACK feedback indication in the feedback message 220. The UE 115-*a* may, in some examples, log the presence of an ACK-to-NACK feedback error (e.g., increment a counter) and determine if the cumulative number of feedback errors exceeds a feedback error threshold. If the number of feedback errors exceeds the feedback error threshold, the UE 115-*a* may transmit a feedback error indication 230.

In response to a NACK-to-ACK feedback error, the base station 105-*a* may transmit the other second control information or second data, or both, in the second downlink transmission 225. The UE 115-*a* may determine a presence of a feedback error based at least in part on not receiving a retransmission of the first control information or the first data, or both after transmitting a NACK feedback indication in the feedback message 220. The UE 115-*a* may log (e.g., store in a data structure in a local or remote memory) the presence of the NACK-to-ACK feedback error (e.g., increment a counter) and determine if the cumulative number of feedback errors exceeds a feedback error threshold. If the number of feedback errors exceeds the feedback error threshold, the UE 115-*a* may transmit a feedback error indication 230. The UE 115-*a* may, in some examples, configure the feedback error indication 230 based at least in part on the received feedback error configuration. The UE 115-*a* may further configure the feedback error indication 230 based at least in part on the satisfied feedback error threshold. The UE 115-*a* may transmit, to the base station 105-*a*, an indication of a type of error, which may include a first type of feedback error for ACK-to-NACK feedback errors and a second type of feedback error for NACK-to-ACK feedback errors.

The UE 115-*a* may be configured to transmit an indication identifying a preference of one or more transmission parameters. In some examples, the indication of preferred transmission parameters may be included in the feedback error indication 230, or alternatively in a separate transmission (e.g., a separate uplink message). The UE 115-*a* may determine the one or more preferred transmission parameters based at least in part on a channel condition (e.g., a channel quality, a path loss measurement, an interference level), a feedback configuration, or any combination thereof. In some examples, a preferred transmission parameter may include an ACK/NACK feedback and CSI coding rate. In some other examples, a preferred transmission parameter may include a preferred ACK/NACK feedback and CSI repetition configuration in PUSCH. In other examples, a preferred transmission parameter may include a preferred resource partition between UCI and data in PUCCH. Additionally, or alternatively, a preferred transmission parameter may include a CSI part 2 omission configuration, a preferred power offset between ACK/NACK feedback, or any combination thereof of the described example preferred transmission parameters.

The UE 115-*a* may transmit the feedback error indication 230 semi-statically via RRC signaling (e.g., in an RRC message) or via an air interface signaling or dynamically via MAC-CE or CSI. The UE 115-*a* may determine whether to transmit the feedback error indication 230 semi-statically or dynamically may depend on the type of feedback error detected, the quantity of the feedback errors detected, or the satisfied feedback error threshold, or any combination thereof. The determination to transmit feedback error indication 230 may be based in part on the relative severity of the feedback error. For example, the UE 115-*a* may be able to tolerate a first type of feedback error without significant impact, but might not tolerate a second type of feedback error. The UE 115-*a* may determine to transmit the feedback error indication 230 semi-statically for a first type of feedback error and dynamically for a second type of feedback error.

The base station 105-*a* may receive, from the UE 115-*a*, the feedback error indication 230. Based at least in part on receiving the feedback error indication 230, the base station 105-*a* may determine to retransmit the first control information or the first data, or both, in third downlink transmission 235, to correct for lost data from a second type of feedback error. Additionally, or alternatively, the base station 105-*a* may determine to change the configuration of one or more transmission parameter based at least in part on receiving the feedback error indication 230, or the indication of preferred transmission parameters, or both from the UE 115-*a*. For example, the base station 105-*a* may determine to change the configuration of one or more of the coding rate for ACK/NACK feedback and CSI; the ACK/NACK feedback and CSI repetition configuration in PUSCH; the resource partition between UCI and data in PUCCH; CSI part 2 omission configuration; or the power offset between ACK/NACK feedback, CSI, and data for a PUSCH based at least in part on the feedback error indication 230 and the indication of preferred transmission parameters from the UE 115-*a*. In some cases, the base station 105-*a* may reconfigure one or more uplink parameters semi-statically via an RRC reconfiguration. In other cases, the base station 105-*a* may reconfigure one or more uplink parameters dynamically via physical downlink control channel (PDCCH) DCI or downlink MAC-CE.

Therefore, by handling feedback errors, the UE 115-*a* may decrease power consumption. The wireless communication system 200 may, as a result, also include improvements to data throughput, spectral efficiency and, in some examples, may promote high reliability and low latency wireless communications (e.g., downlink reception, uplink transmission), among other benefits.

Figure 3:
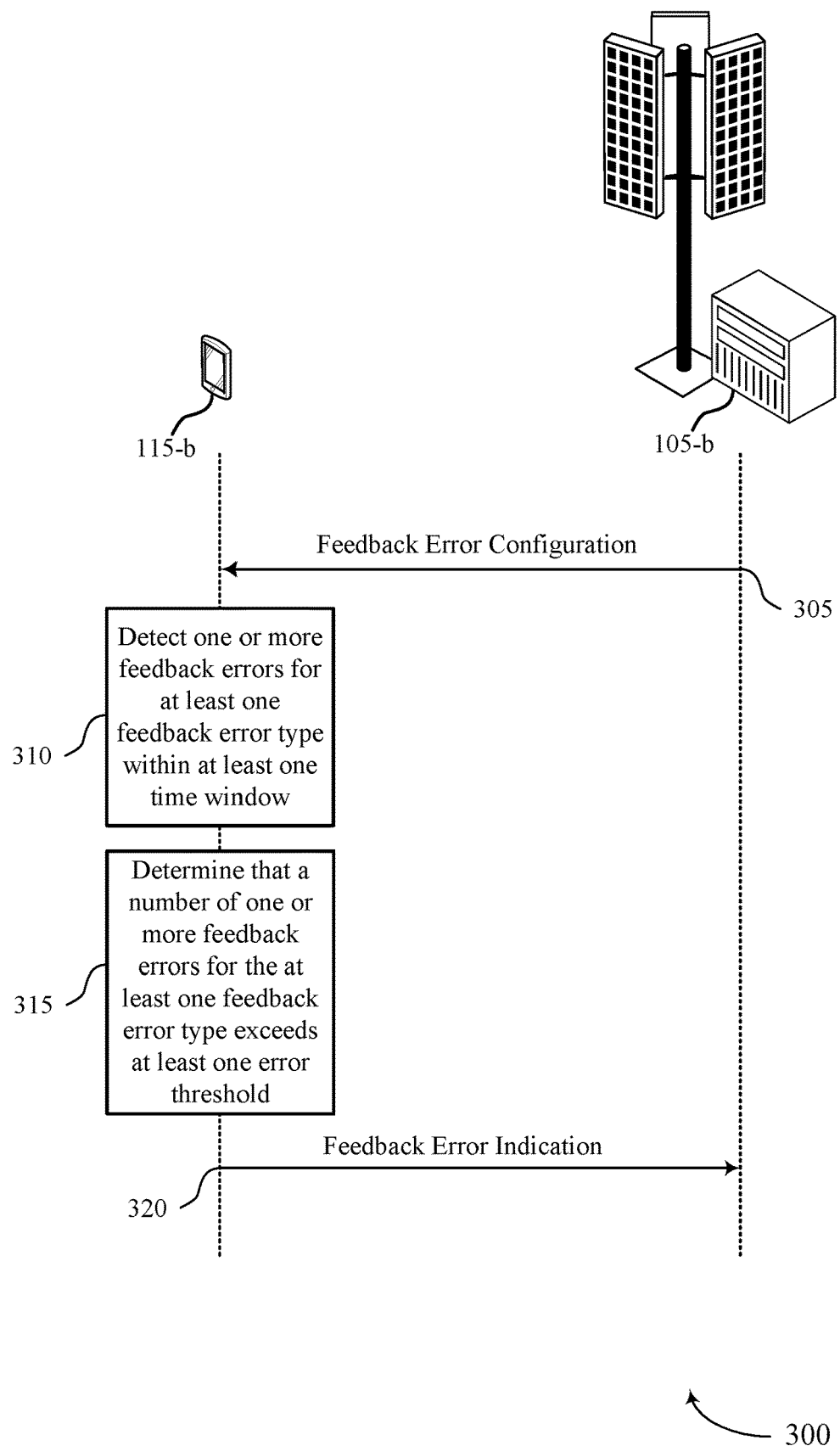
FIG. 3 illustrates an example of a process flow in accordance with aspects of the present disclosure.

FIG. 3 illustrates an example of a process flow 300 in accordance with aspects of the present disclosure. The process flow 300 may implement aspects of the wireless communications system 100 and the wireless communications system 200 described with reference to FIGS. 1 and 2, respectively. The process flow 300 may be based on a configuration by a base station 105-*b* and implemented by a UE 115-*b* to promote power saving for the UE 115-*b* by handling feedback error. The process flow 300 may also be based on a configuration by the base station 105-*b* and implemented by the UE 115-*b* to promote high reliability and low latency wireless communications (e.g., downlink reception, uplink transmission), among other benefits.

In the following description of the process flow 300, the operations between the base station 105-*b* and the UE 115-*b* may be transmitted in a different order than the example order shown, or the operations performed by the base station 105-*b* and the UE 115-*b* may be performed in different orders or at different times. Some operations may also be omitted from the process flow 300, and other operations may be added to the process flow 300. The base station 105-*b* and the UE 115-*b* may be examples of a base station 105 and a UE 115 as described with reference to FIGS. 1 and 2, respectively.

At 305, the base station 105-*b* may transmit a feedback error configuration to the UE 115-*b*. In some examples, the base station 105-*b* may transmit a feedback error configuration to the UE 115-*b* via semi-static signaling. For example, the base station 105-*b* may transmit a feedback error configuration to the UE 115-*b* in an RRC message. In some other examples, the base station 105-*b* may transmit a feedback error configuration to the UE 115-*b* via dynamic signaling. For example, the base station 105-*b* may transmit a feedback error configuration to the UE 115-*b* in a DCI message or a MAC-CE message, or the like. The feedback error configuration may include an indication of at least one feedback error type of a plurality of feedback error types and at least one time window for feedback error detection per frequency band combination, as described herein.

At 310, the UE 115-*b* may detect one or more feedback errors for the at least one feedback error type within at least one time window. For example, the UE 115-*b* may receive, from the base station 105-*b*, the feedback error configuration and detect the one or more feedback errors for the at least one feedback error type within at least one time window according to the feedback error configuration. At 315, the UE 115-*b* may determine that a number of one or more feedback errors for the at least one feedback error type exceeds at least one error threshold. At 320, the UE 115-*b* may transmit a feedback error indication to the base station 105-*b*. For example, the UE 115-*b* may transmit the feedback error indication to the base station 105-*b* via a UCI message, a CSI report, or the like.

Figure 4:
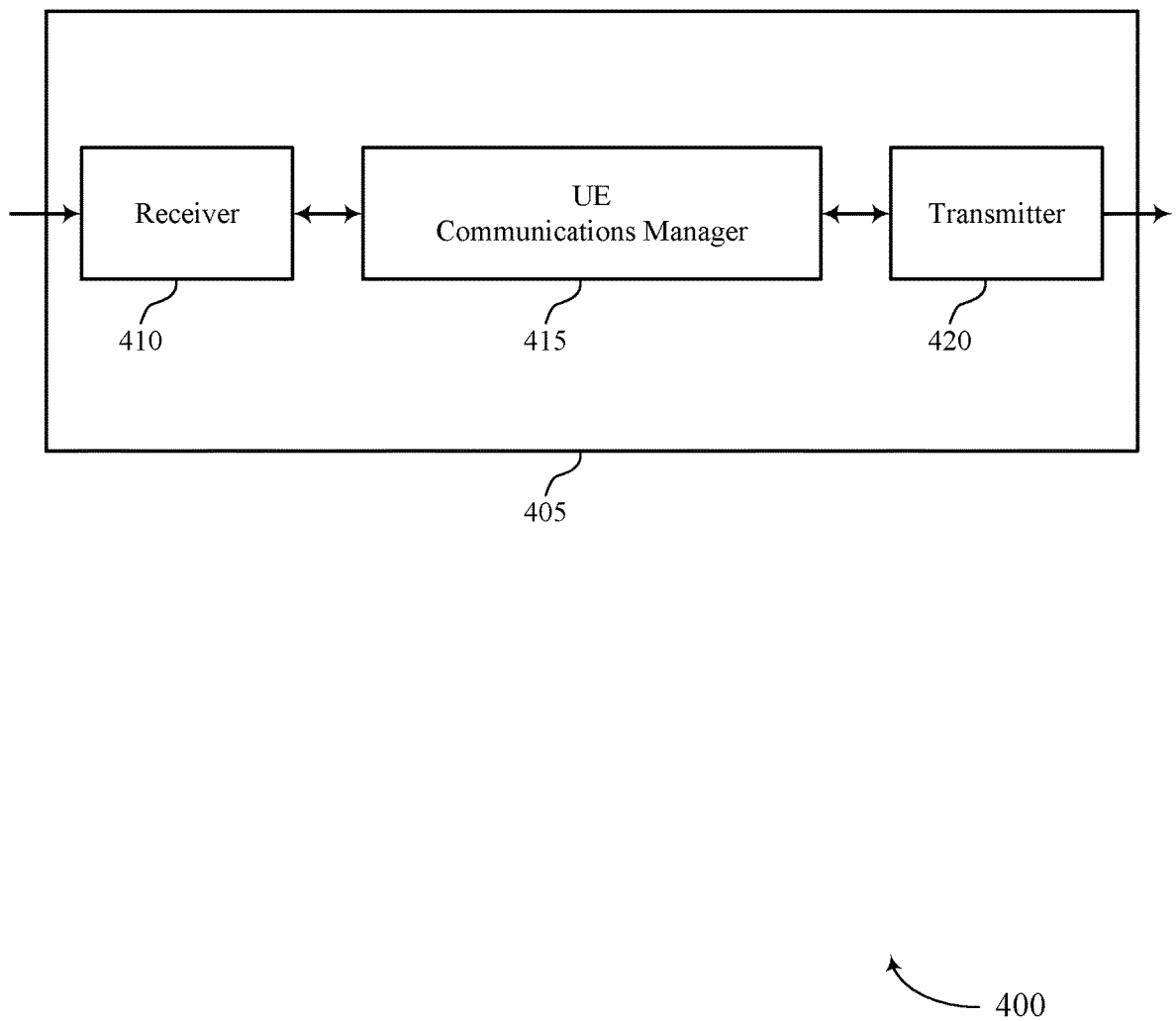
FIGS. 4 and 5 show block diagrams of devices in accordance with aspects of the present disclosure.

FIG. 4 shows a block diagram 400 of a device 405 in accordance with aspects of the present disclosure. The device 405 may be an example of aspects of a UE 115 as described herein. The device 405 may include a receiver 410, a UE communications manager 415, and a transmitter 420. The device 405 may also include a processor. Each of these components may be in communication with one another (e.g., via one or more buses).

The receiver 410 may receive information such as packets, user data, or control information associated with various information channels (e.g., control channels, data channels, and information related to feedback error handling for wireless systems, etc.). Information may be passed on to other components of the device 405. The receiver 410 may be an example of aspects of the transceiver 720 described with reference to FIG. 7. The receiver 410 may utilize a single antenna or a set of antennas.

The UE communications manager 415 may be implemented as an integrated circuit or chipset for the device 405, and the receiver 410 and the transmitter 420 may be implemented as analog components (for example, amplifiers, filters, antennas) coupled with the device 405 modem to enable wireless transmission and reception. The actions performed by the UE communications manager 415 as described herein may be implemented to realize one or more potential advantages. At least one implementation may enable the UE communications manager 415 to support feedback error handling. For example, the UE communications manager 415 may receive, from a base station, a feedback error configuration indicating at least one error threshold associated with at least one feedback error type of a plurality of feedback error types, and at least one time window for feedback error detection per frequency band combination. The UE communications manager 415 may detect one or more feedback errors for the at least one feedback error type within the at least one time window. The UE communications manager 415 may transmit, to the base station, a feedback error indication based on a number of the one or more feedback errors exceeding the at least one error threshold, where the feedback error indication includes an indication of the one or more feedback errors and the at least one feedback error type associated with the one or more feedback errors. The UE communications manager 415 may be an example of aspects of the UE communications manager 710 described herein. Based on implementing the feedback error handling, one or more processors of the device 405 (for example, processor(s) controlling or incorporated with the UE communications manager 415) may promote improvements to power consumption, and, in some examples, may promote enhanced efficiency for high reliability and low latency wireless communications (e.g., downlink reception, uplink transmission), among other benefits.

The UE communications manager 415, or its sub-components, may be implemented in hardware, code (e.g., software or firmware) executed by a processor, or any combination thereof. If implemented in code executed by a processor, the functions of the UE communications manager 415, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The UE communications manager 415, or its sub-components, may be physically located at various positions, including being distributed such that portions of functions are implemented at different physical locations by one or more physical components. In some examples, the UE communications manager 415, or its sub-components, may be a separate and distinct component in accordance with various aspects of the present disclosure. In some examples, the UE communications manager 415, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 420 may transmit signals generated by other components of the device 405. In some examples, the transmitter 420 may be collocated with a receiver 410 in a transceiver component. For example, the transmitter 420 may be an example of aspects of the transceiver 720 described with reference to FIG. 7. The transmitter 420 may utilize a single antenna or a set of antennas.

Figure 5:
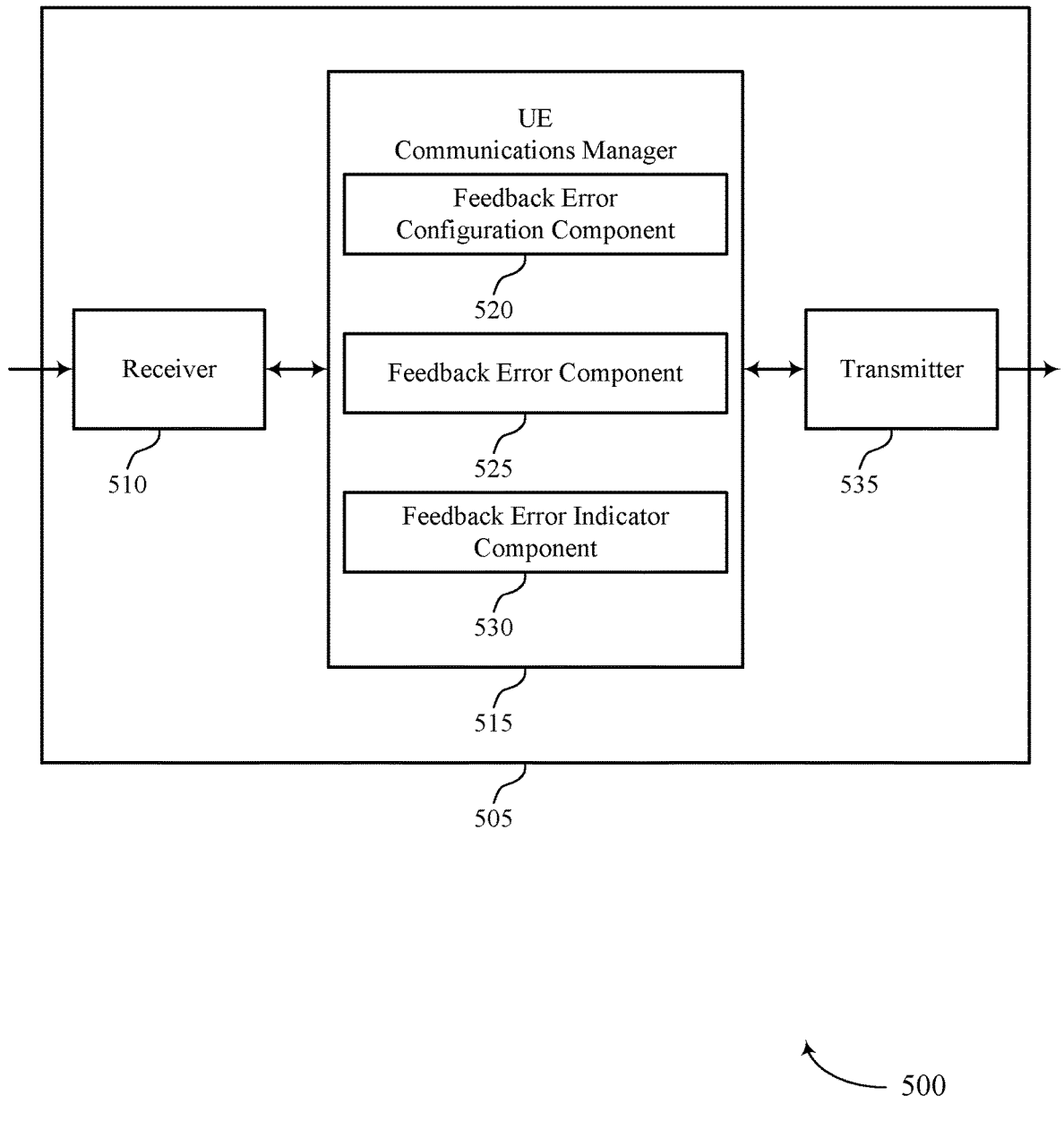

FIG. 5 shows a block diagram 500 of a device 505 in accordance with aspects of the present disclosure. The device 505 may be an example of aspects of a device 405, or a UE 115 as described herein. The device 505 may include a receiver 510, a UE communications manager 515, and a transmitter 535. The device 505 may also include a processor. Each of these components may be in communication with one another (e.g., via one or more buses).

The receiver 510 may receive information such as packets, user data, or control information associated with various information channels (e.g., control channels, data channels, and information related to feedback error handling for wireless systems, etc.). Information may be passed on to other components of the device 505. The receiver 510 may be an example of aspects of the transceiver 720 described with reference to FIG. 7. The receiver 510 may utilize a single antenna or a set of antennas.

The UE communications manager 515 may be an example of aspects of the UE communications manager 415 as described herein. The UE communications manager 515 may include a feedback error configuration component 520, a feedback error component 525, and a feedback error indicator component 530. The UE communications manager 515 may be an example of aspects of the UE communications manager 710 described herein. The feedback error configuration component 520 may receive, from a base station, a feedback error configuration indicating at least one error threshold associated with at least one feedback error type of a plurality of feedback error types, and at least one time window for feedback error detection per frequency band combination. The feedback error component 525 may detect one or more feedback errors for the at least one feedback error type within the at least one time window. The feedback error indicator component 530 may transmit, to the base station, a feedback error indication based on a number of the one or more feedback errors exceeding the at least one error threshold, where the feedback error indication includes an indication of the one or more feedback errors and the at least one feedback error type associated with the one or more feedback errors.

The transmitter 535 may transmit signals generated by other components of the device 505. In some examples, the transmitter 535 may be collocated with a receiver 510 in a transceiver component. For example, the transmitter 535 may be an example of aspects of the transceiver 720 described with reference to FIG. 7. The transmitter 535 may utilize a single antenna or a set of antennas.

Figure 6:
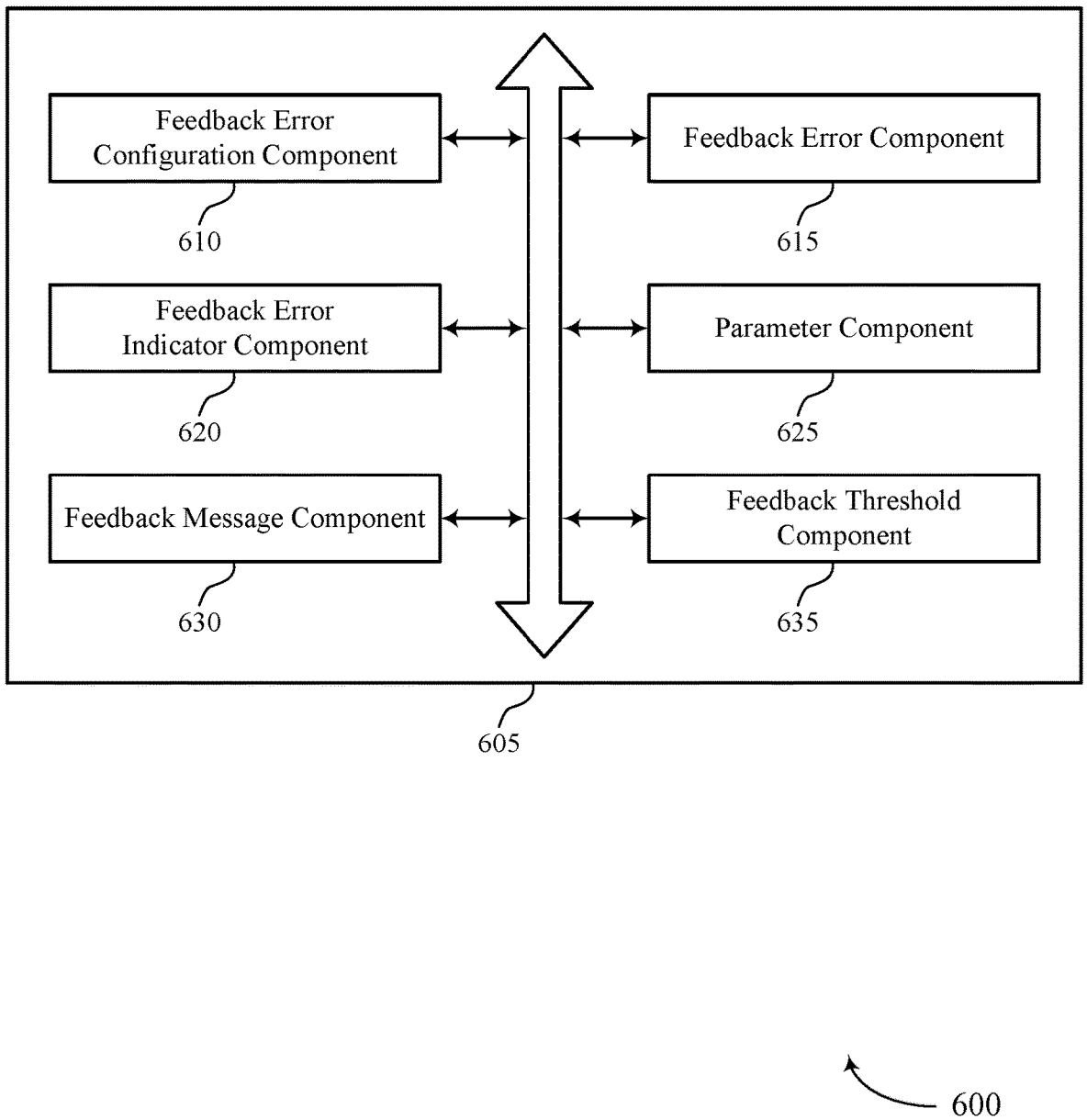
FIG. 6 shows a block diagram of a UE communications manager in accordance with aspects of the present disclosure.

FIG. 6 shows a block diagram 600 of a UE communications manager 605 in accordance with aspects of the present disclosure. The UE communications manager 605 may be an example of aspects of a UE communications manager 415, a UE communications manager 515, or a UE communications manager 710 described herein. The UE communications manager 605 may include a feedback error configuration component 610, a feedback error component 615, a feedback error indicator component 620, a parameter component 625, a feedback message component 630, and a feedback threshold component 635. Each of these components may communicate, directly or indirectly, with one another (e.g., via one or more buses).

The feedback error configuration component 610 may receive, from a base station, a feedback error configuration indicating at least one error threshold associated with at least one feedback error type of a plurality of feedback error types, and at least one time window for feedback error detection per frequency band combination. In some examples, the feedback error configuration component 610 may receive the feedback error configuration per frequency band combination via RRC signaling. In some examples, the feedback error configuration component 610 may receive a reconfiguration message that indicates a resource partition change or, a power offset modification, or both, in response to the transmitted feedback error indication.

The feedback error component 615 may detect one or more feedback errors for the at least one feedback error type within the at least one time window. In some examples, the feedback error component 615 may determine that a number of the one or more feedback errors for the at least one feedback error type exceeds the at least one error threshold. The feedback error indicator component 620 may transmit, to the base station, a feedback error indication based on the determination that the number of the detected one or more feedback errors exceeds the at least one error threshold, where the feedback error indication includes an indication of the one or more feedback errors and the at least one feedback error type associated with the one or more feedback errors.

In some examples, the feedback error indicator component 620 may transmit the feedback error indication semi-statically based on the at least one feedback error type being an ACK to NACK error.

The feedback error indicator component 620 may transmit the feedback error indication via RRC signaling. In some examples, the feedback error indicator component 620 may transmit the feedback error indication dynamically based on the at least one feedback error type including a NACK to ACK error. In some examples, the feedback error indicator component 620 may transmit the feedback error indication via a CSI or a MAC-CE. In some examples, the feedback error indicator component 620 may transmit the feedback error indication via RRC signaling, a MAC-CE signaling, a CSI, or any combination thereof.

The parameter component 625 may determine a UE preference for one or more transmission parameters based on the determination that the number of the one or more feedback errors for the at least one feedback error type exceeds the at least one error threshold, where the feedback error indication includes an indication of the one or more transmission parameters. In some examples, the parameter component 625 may determine a coding rate for ACK NACK feedback and CSI in a PUSCH, an ACK/NACK feedback and CSI repetition configuration in one or both of the PUSCH or a PUCCH, a resource partition configuration between UCI and data in the PUSCH, a preference to drop one or more CSI parts or data in the PUSCH, or a power offset between ACK/NACK feedback, a CSI, and data in the PUSCH, or any combination thereof.

The feedback message component 630 may transmit an ACK feedback message based on a successful reception of a data transmission (also referred to as a downlink transmission). In some examples, the feedback message component 630 may receive a retransmission of the data transmission after transmitting the ACK feedback message within the at least one time window, where the one or more feedback errors for the at least one feedback error type are detected based at least in part on the received retransmission of the data transmission in response to the transmitted ACK feedback message. In some examples, the feedback message component 630 may determine that the at least one feedback error type associated with the one or more feedback errors is an ACK to NACK error based on the received retransmission of the data transmission in response to the transmitted ACK feedback message. In some examples, the feedback message component 630 may transmit a NACK feedback message based on an unsuccessful reception of a first data transmission. In some examples, the feedback message component 630 may receive, after transmitting the NACK feedback message, a second data transmission different from the first data transmission within the at least one time window, where the one or more feedback errors for the at least one feedback error type are detected based at least in part on the received second data transmission in response to the transmitted NACK feedback message. In some examples, the feedback message component 630 may determine that the at least one feedback error type associated with the one or more feedback errors is a NACK to ACK error based on the received second data transmission in response to the transmitted NACK feedback message.

The feedback threshold component 635 may determine a first error threshold for a first feedback error type and a second error threshold for a second feedback error type based on the feedback error configuration, where the feedback error indication indicates the first feedback error type based on the one or more feedback errors being associated with the first feedback error type and the number of the one or more feedback errors exceeding the first error threshold or the feedback error indication indicating the second feedback error type based on the one or more feedback errors being associated with the second feedback error type and the number of the one or more feedback errors exceeding the second error threshold. In some cases, the first feedback error type includes an ACK to NACK error type and the second feedback error type includes a NACK to ACK error type. In some cases, the first error threshold is greater than the second error threshold.

Figure 7:
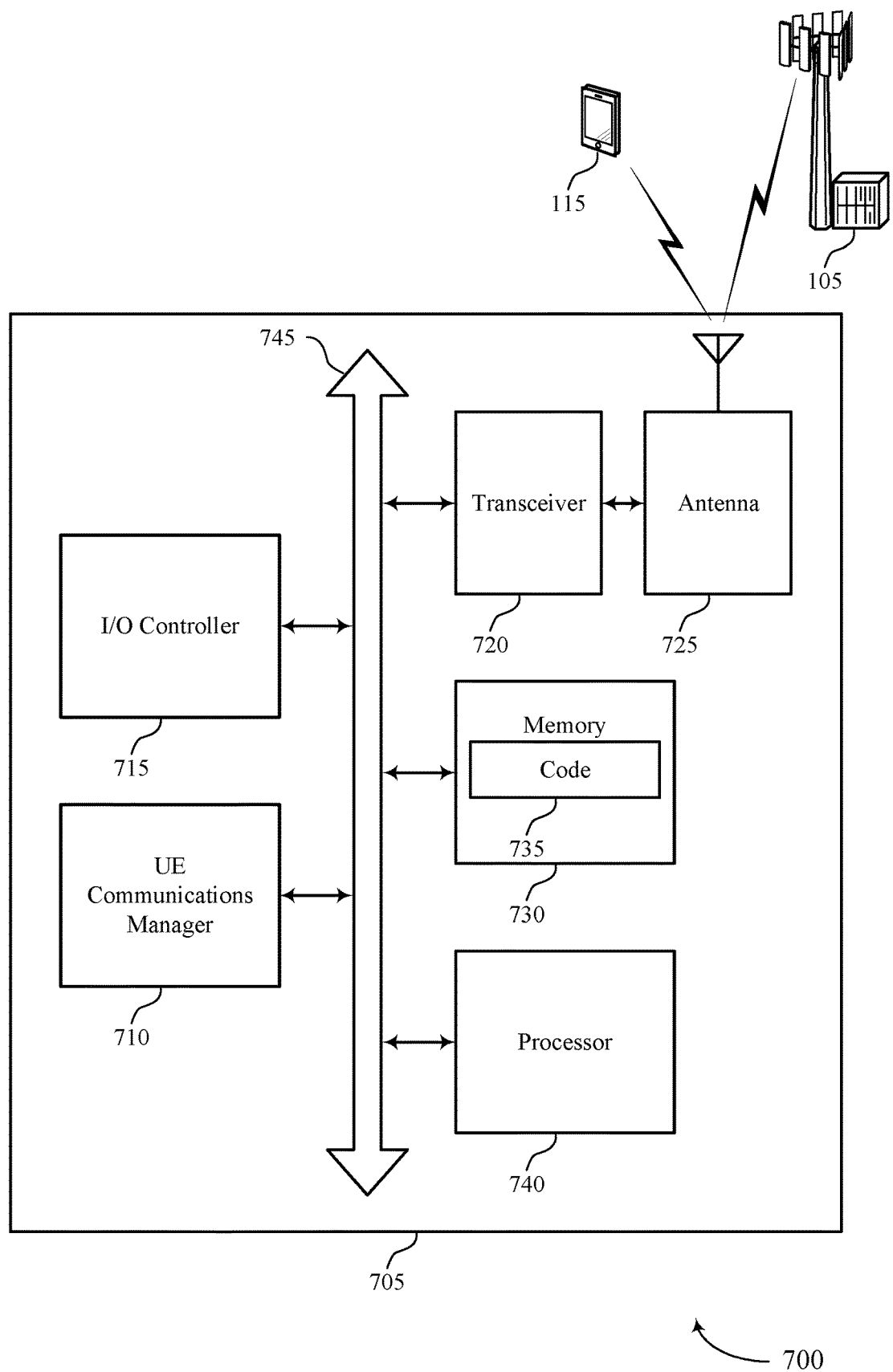
FIG. 7 shows a diagram of a system including a device in accordance with aspects of the present disclosure.

FIG. 7 shows a diagram of a system 700 including a device 705 in accordance with aspects of the present disclosure. The device 705 may be an example of or include the components of device 405, device 505, or a UE 115 as described herein. The device 705 may include components for bi-directional voice and data communications including components for transmitting and receiving communications, including a UE communications manager 710, an I/O controller 715, a transceiver 720, an antenna 725, memory 730, and a processor 740. These components may be in electronic communication via one or more buses (e.g., bus 745).

At least one implementation may enable the UE communications manager 710 to support feedback error handling. For example, the UE communications manager 710 may receive, from a base station, a feedback error configuration indicating at least one error threshold associated with at least one feedback error type of a plurality of feedback error types, and at least one time window for feedback error detection per frequency band combination. The UE communications manager 710 may detect one or more feedback errors for the at least one feedback error type within the at least one time window. The UE communications manager 710 may transmit, to the base station, a feedback error indication based on a number of the one or more feedback errors exceeding the at least one error threshold, where the feedback error indication includes an indication of the one or more feedback errors and the at least one feedback error type associated with the one or more feedback errors. Based on implementing the feedback error handling, one or more processors of the device 705 (for example, processor(s) controlling or incorporated with the UE communications manager 710) may promote improvements to power consumption, and, in some examples, may promote enhanced efficiency for high reliability and low latency wireless communications (e.g., downlink reception, uplink transmission), among other benefits.

The I/O controller 715 may manage input and output signals for the device 705. The I/O controller 715 may also manage peripherals not integrated into the device 705. In some cases, the I/O controller 715 may represent a physical connection or port to an external peripheral. In some cases, the I/O controller 715 may utilize an operating system such as iOS®, ANDROID®, MS-DOS®, MS-WINDOWS®, OS/2®, UNIX®, LINUX®, or another known operating system. In other cases, the I/O controller 715 may represent or interact with a modem, a keyboard, a mouse, a touchscreen, or a similar device. In some cases, the I/O controller 715 may be implemented as part of a processor. In some cases, a user may interact with the device 705 via the I/O controller 715 or via hardware components controlled by the I/O controller 715.

The transceiver 720 may communicate bi-directionally, via one or more antennas, wired, or wireless links as described above. For example, the transceiver 720 may represent a wireless transceiver and may communicate bi-directionally with another wireless transceiver. The transceiver 720 may also include a modem to modulate the packets and provide the modulated packets to the antennas for transmission, and to demodulate packets received from the antennas. In some cases, the device 705 may include a single antenna 725. However, in some cases, the device 705 may have more than one antenna 725, which may be capable of concurrently transmitting or receiving multiple wireless transmissions.

The memory 730 may include RAM and ROM. The memory 730 may store computer-readable, computer-executable code 735 including instructions that, when executed, cause the processor 740 to perform various functions described herein. In some cases, the memory 730 may contain, among other things, a BIOS which may control basic hardware or software operation such as the interaction with peripheral components or devices.

The code 735 may include instructions to implement aspects of the present disclosure, including instructions to support wireless communications. The code 735 may be stored in a non-transitory computer-readable medium such as system memory or other type of memory. In some cases, the code 735 may not be directly executable by the processor 740 but may cause a computer (e.g., when compiled and executed) to perform functions described herein.

The processor 740 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 740 may be configured to operate a memory array using a memory controller. In other cases, a memory controller may be integrated into the processor 740. The processor 740 may be configured to execute computer-readable instructions stored in a memory (e.g., the memory 730) to cause the device 705 to perform various functions (e.g., functions or tasks supporting feedback error handling for wireless systems).

Figure 8:
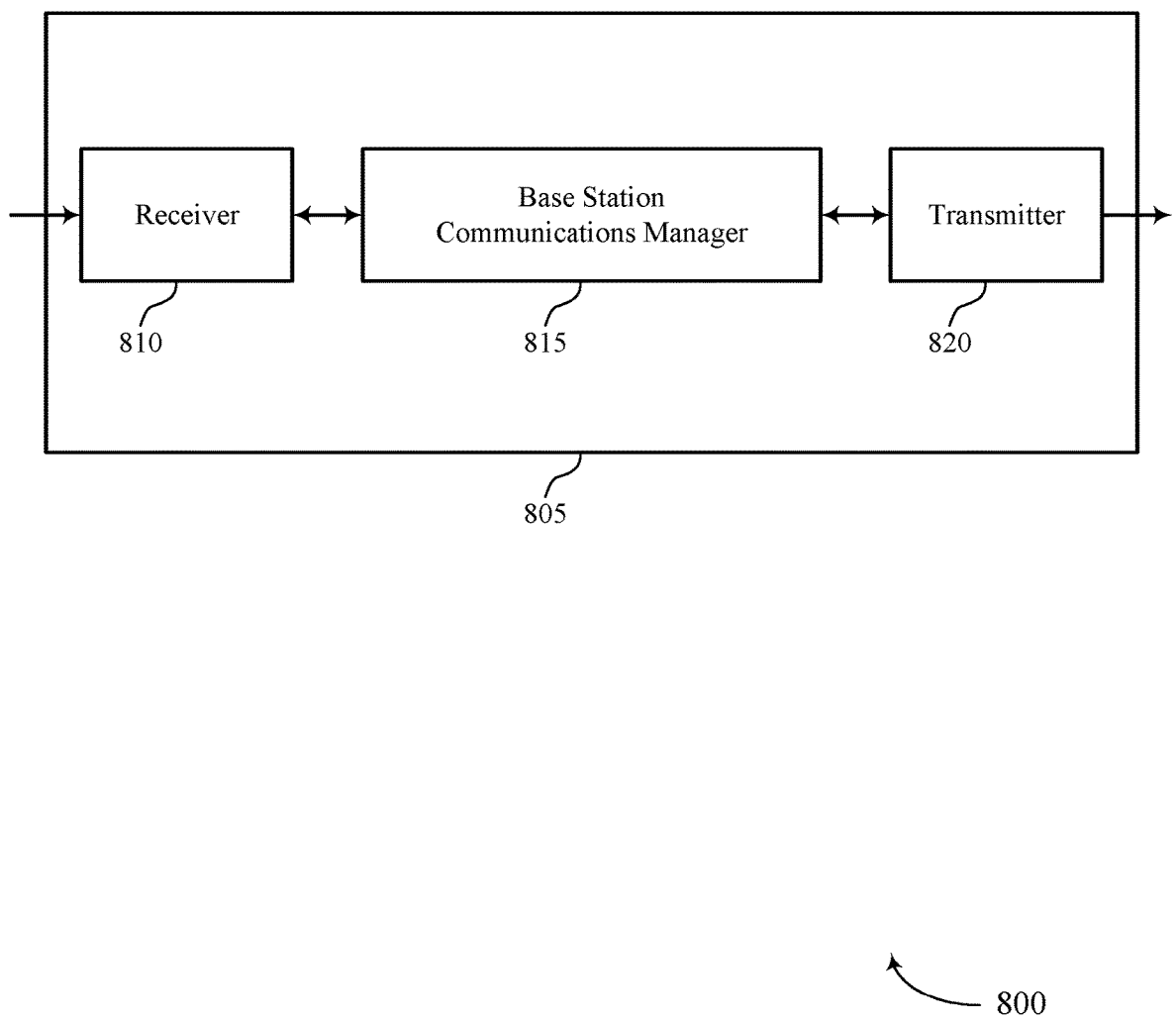
FIGS. 8 and 9 show block diagrams of devices in accordance with aspects of the present disclosure.

FIG. 8 shows a block diagram 800 of a device 805 in accordance with aspects of the present disclosure. The device 805 may be an example of aspects of a base station 105 as described herein. The device 805 may include a receiver 810, a base station communications manager 815, and a transmitter 820. The device 805 may also include a processor. Each of these components may be in communication with one another (e.g., via one or more buses).

The receiver 810 may receive information such as packets, user data, or control information associated with various information channels (e.g., control channels, data channels, and information related to feedback error handling for wireless systems, etc.). Information may be passed on to other components of the device 805. The receiver 810 may be an example of aspects of the transceiver 1120 described with reference to FIG. 11. The receiver 810 may utilize a single antenna or a set of antennas.

The base station communications manager 815 may transmit, to a UE, a feedback error configuration indicating at least one error threshold associated with a feedback error type of a plurality of feedback error types and at least one time window for feedback error detection at the UE, transmit a data message to the UE, and receive, from the UE, a feedback error indication indicating one or more feedback errors detected by the UE and the feedback error type associated with the one or more feedback errors. The base station communications manager 815 may be an example of aspects of the base station communications manager 1110 described herein.

The base station communications manager 815, or its sub-components, may be implemented in hardware, code (e.g., software or firmware) executed by a processor, or any combination thereof. If implemented in code executed by a processor, the functions of the base station communications manager 815, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The base station communications manager 815, or its sub-components, may be physically located at various positions, including being distributed such that portions of functions are implemented at different physical locations by one or more physical components. In some examples, the base station communications manager 815, or its sub-components, may be a separate and distinct component in accordance with various aspects of the present disclosure. In some examples, the base station communications manager 815, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 820 may transmit signals generated by other components of the device 805. In some examples, the transmitter 820 may be collocated with a receiver 810 in a transceiver component. For example, the transmitter 820 may be an example of aspects of the transceiver 1120 described with reference to FIG. 11. The transmitter 820 may utilize a single antenna or a set of antennas.

Figure 9:
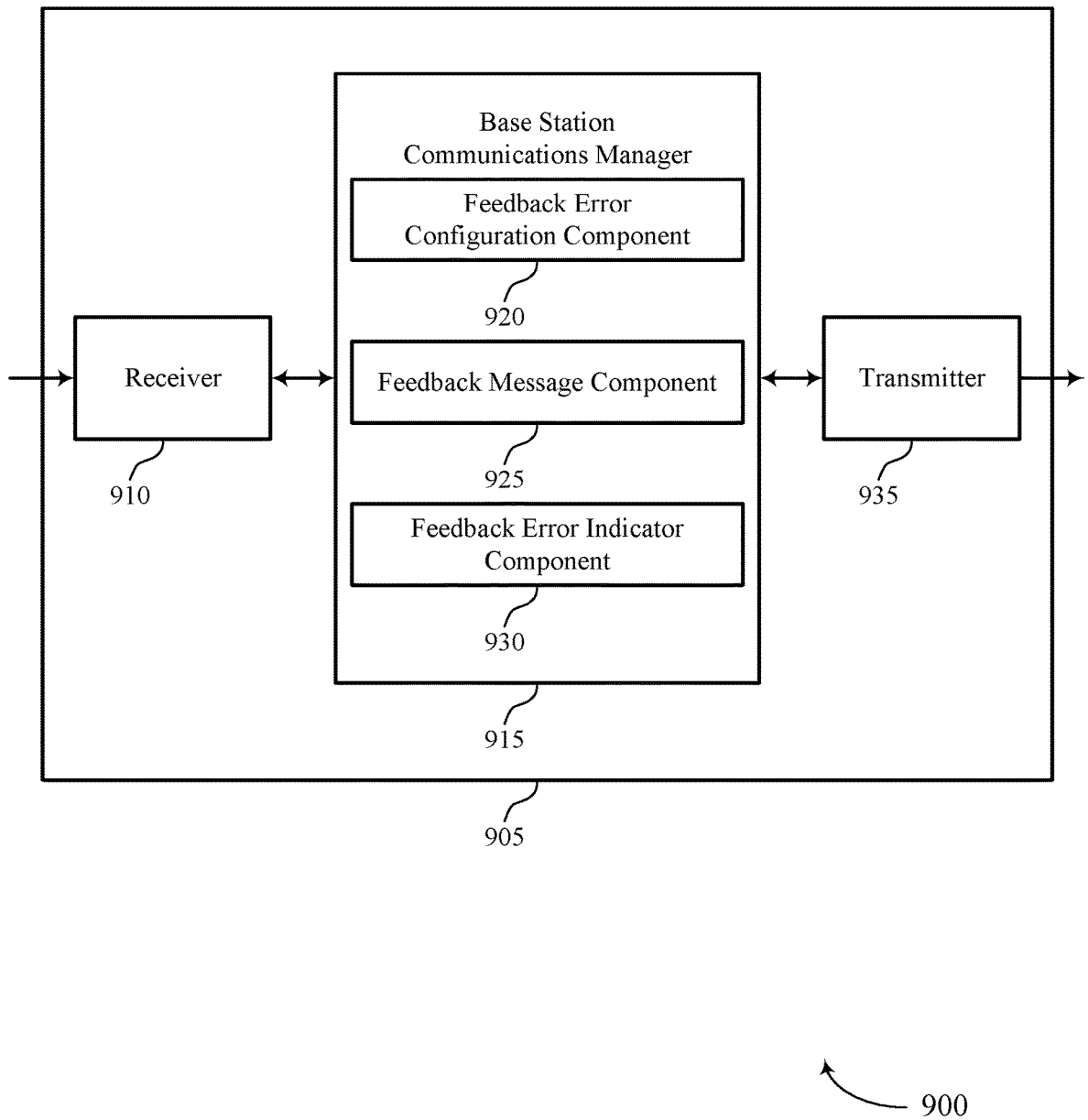

FIG. 9 shows a block diagram 900 of a device 905 in accordance with aspects of the present disclosure. The device 905 may be an example of aspects of a device 805, or a base station 105 as described herein. The device 905 may include a receiver 910, a base station communications manager 915, and a transmitter 935. The device 905 may also include a processor. Each of these components may be in communication with one another (e.g., via one or more buses).

The receiver 910 may receive information such as packets, user data, or control information associated with various information channels (e.g., control channels, data channels, and information related to feedback error handling for wireless systems, etc.). Information may be passed on to other components of the device 905. The receiver 910 may be an example of aspects of the transceiver 1120 described with reference to FIG. 11. The receiver 910 may utilize a single antenna or a set of antennas.

The base station communications manager 915 may be an example of aspects of the base station communications manager 815 as described herein. The base station communications manager 915 may include a feedback error configuration component 920, a feedback message component 925, and a feedback error indicator component 930. The base station communications manager 915 may be an example of aspects of the base station communications manager 1110 described herein.

The feedback error configuration component 920 may transmit, to a UE, a feedback error configuration indicating at least one error threshold associated with a feedback error type of a plurality of feedback error types and at least one time window for feedback error detection at the UE. The feedback message component 925 may transmit a data message to the UE. The feedback error indicator component 930 may receive, from the UE, a feedback error indication indicating one or more feedback errors detected by the UE and the feedback error type associated with the one or more feedback errors.

The transmitter 935 may transmit signals generated by other components of the device 905. In some examples, the transmitter 935 may be collocated with a receiver 910 in a transceiver component. For example, the transmitter 935 may be an example of aspects of the transceiver 1120 described with reference to FIG. 11. The transmitter 935 may utilize a single antenna or a set of antennas.

Figure 10:
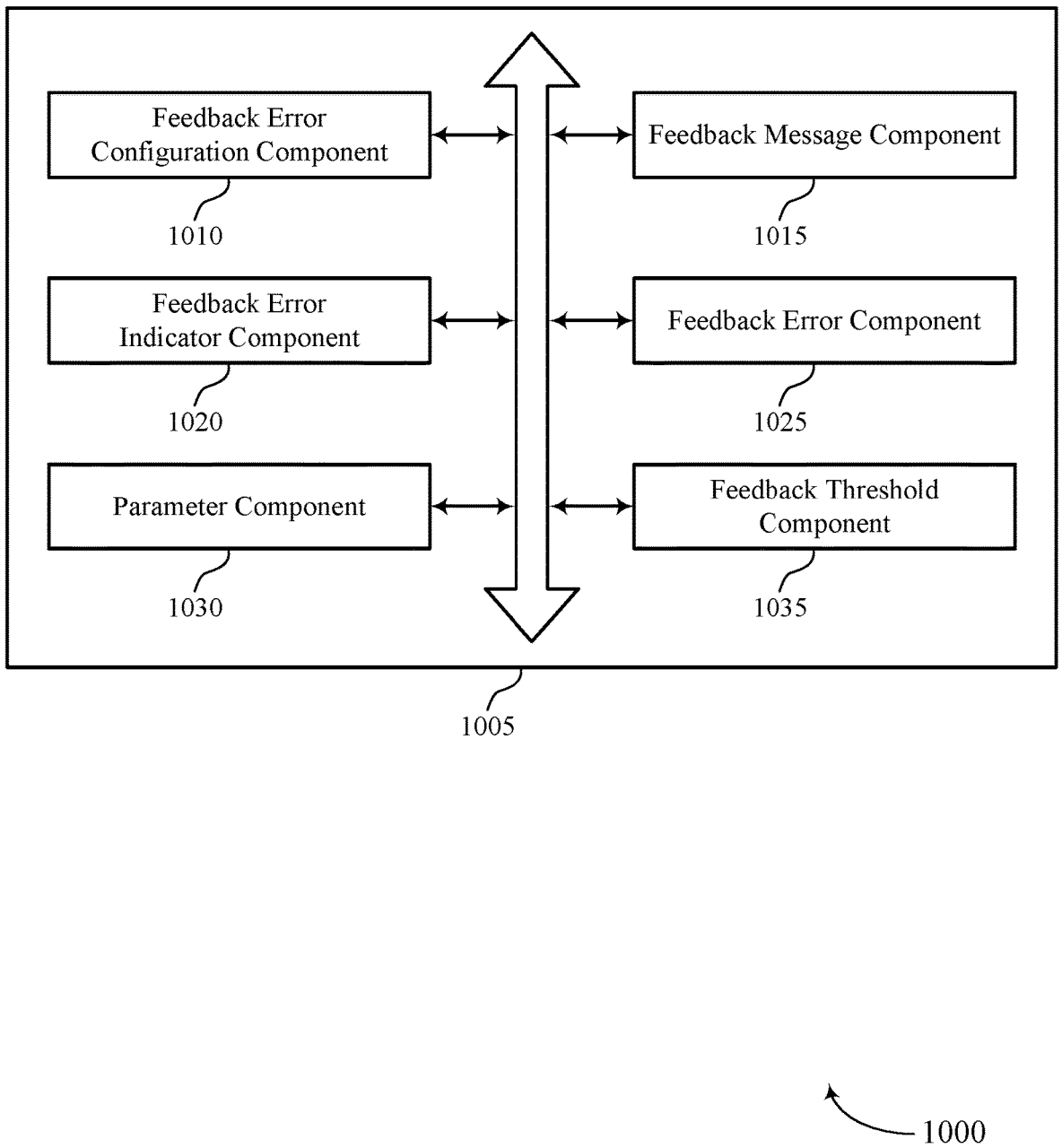
FIG. 10 shows a block diagram of a base station communications manager in accordance with aspects of the present disclosure.

FIG. 10 shows a block diagram 1000 of a base station communications manager 1005 in accordance with aspects of the present disclosure. The base station communications manager 1005 may be an example of aspects of a base station communications manager 815, a base station communications manager 915, or a base station communications manager 1110 described herein. The base station communications manager 1005 may include a feedback error configuration component 1010, a feedback message component 1015, a feedback error indicator component 1020, a feedback error component 1025, a parameter component 1030, and a feedback threshold component 1035. Each of these components may communicate, directly or indirectly, with one another (e.g., via one or more buses).

The feedback error configuration component 1010 may transmit, to a UE, a feedback error configuration indicating at least one error threshold associated with a feedback error type of a plurality of feedback error types and at least one time window for feedback error detection at the UE. In some examples, the feedback error configuration component 1010 may transmit the feedback error configuration via RRC signaling. The feedback message component 1015 may transmit a data message to the UE. In some cases, the first feedback error type includes an ACK to NACK error type and the second feedback error type includes a NACK to ACK error type. In some cases, the first error threshold is greater than the second error threshold.

The feedback error indicator component 1020 may receive, from the UE, a feedback error indication indicating one or more feedback errors detected by the UE and the feedback error type associated with the one or more feedback errors. In some examples, the feedback error indicator component 1020 may receive the feedback error indication semi-statically based on the feedback error type being a NACK to ACK error. In some examples, the feedback error indicator component 1020 may receive the feedback error indication dynamically based on the feedback error type being a NACK to ACK error. In some cases, the feedback error indication is received via RRC signaling. In some cases, the feedback error indication is received via a CSI or a MAC-CE, or both.

The feedback error component 1025 may determine that the feedback error type associated with the one or more feedback errors is an ACK to NACK error based on the feedback error indication. In some examples, the feedback error component 1025 may determine that the feedback error type associated with the one or more feedback errors is a NACK to ACK error based on the feedback error indication. In some examples, the feedback error component 1025 may transmit a retransmission of the data transmission to the UE based on the feedback error type being the NACK to ACK error.

The parameter component 1030 may modify one or more transmission parameters at the base station based on the feedback error type being the ACK to NACK error. In some examples, the parameter component 1030 may transmit, to the UE, a second data transmission based on the modified one or more transmission parameters. In some examples, the parameter component 1030 may determine a UE preference for one or more transmission parameters based on the received feedback error indication. In some examples, the parameter component 1030 may modify a set of transmission parameters at the base station based on the UE preference for one or more transmission parameters. In some examples, the parameter component 1030 may transmit, to the UE, an indication of the modified set of transmission parameters.

In some examples, the parameter component 1030 may determine a coding rate for ACK NACK feedback and CSI in a PUSCH, an ACK/NACK feedback and CSI repetition configuration in the PUSCH, a resource partition configuration between UCI and data in a PUCCH, a preference to drop one or more CSI parts or data in the PUSCH, or a power offset between ACK/NACK feedback, a CSI, and data in the PUSCH, or any combination thereof. In some examples, the parameter component 1030 may modify a set of transmission parameters at the base station based on the feedback error indication, where the set of transmission parameters includes a resource partition or a power offset, or both. In some examples, the parameter component 1030 may transmit a reconfiguration message that indicates a resource partition change or a power offset modification, or both, based on the modifying.

The feedback threshold component 1035 may determine a first error threshold for a first feedback error type and a second error threshold for a second feedback error type based on the feedback error configuration, where the feedback error configuration includes the first error threshold and the second error threshold. In some cases, the feedback error indication indicates the first feedback error type based on the one or more feedback errors being associated with the first feedback error type and a number of the one or more feedback errors exceeding the first error threshold or the feedback error indication indicates the second feedback error type based on the one or more feedback errors being associated with the second feedback error type and the number of the one or more feedback errors exceeding the second error threshold.

Figure 11:
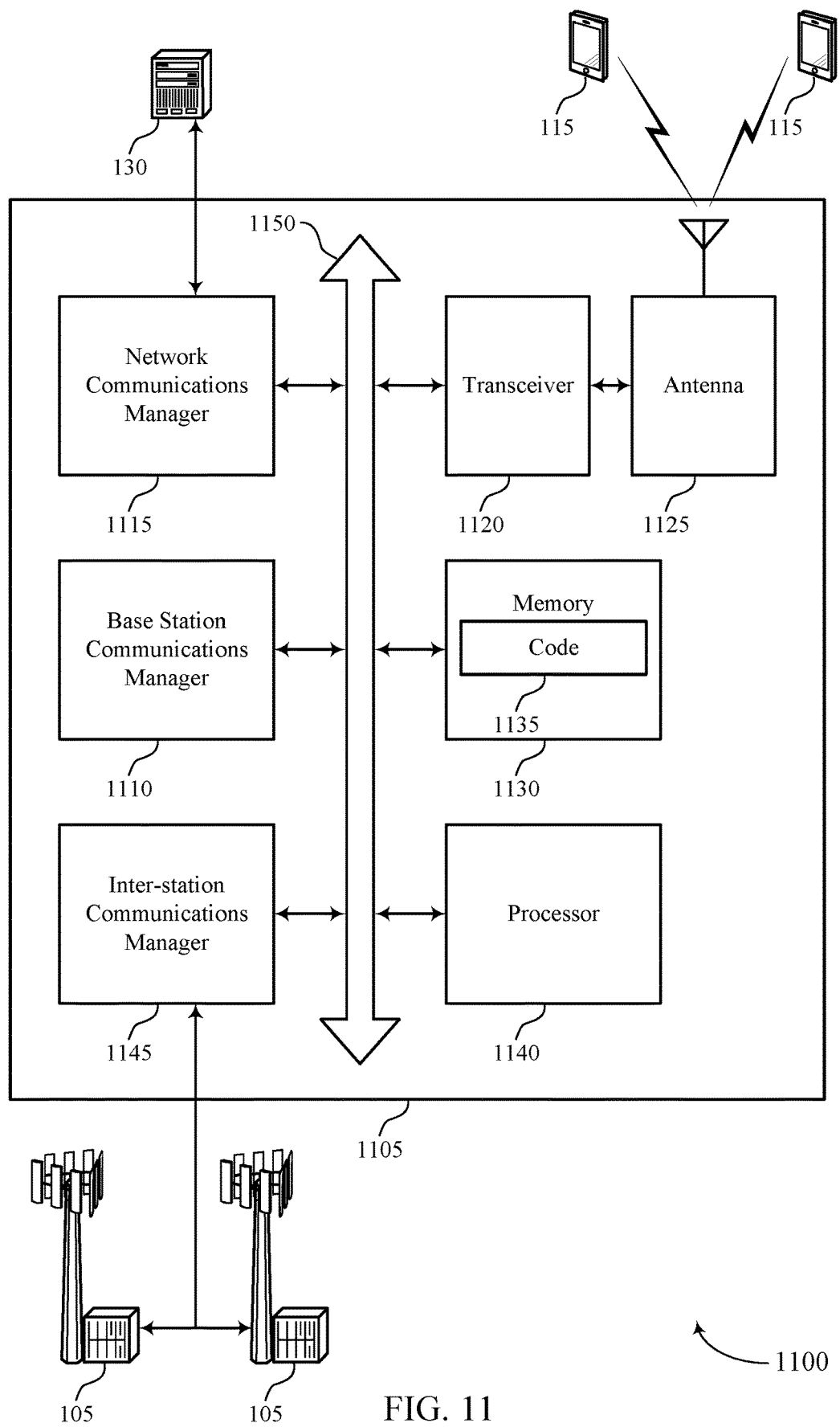
FIG. 11 shows a diagram of a system including a device in accordance with aspects of the present disclosure.

FIG. 11 shows a diagram of a system 1100 including a device 1105 in accordance with aspects of the present disclosure. The device 1105 may be an example of or include the components of device 805, device 905, or a base station 105 as described herein. The device 1105 may include components for bi-directional voice and data communications including components for transmitting and receiving communications, including a base station communications manager 1110, a network communications manager 1115, a transceiver 1120, an antenna 1125, memory 1130, a processor 1140, and an inter-station communications manager 1145. These components may be in electronic communication via one or more buses (e.g., bus 1150).

The base station communications manager 1110 may transmit, to a UE, a feedback error configuration indicating at least one error threshold and at least one time window for feedback error detection at the UE, transmit a data message to the UE, and receive, from the UE, a feedback error indication indicating one or more feedback errors detected by the UE and a feedback error type associated with the one or more feedback errors. The network communications manager 1115 may manage communications with the core network (e.g., via one or more wired backhaul links). For example, the network communications manager 1115 may manage the transfer of data communications for client devices, such as one or more UEs 115.

The transceiver 1120 may communicate bi-directionally, via one or more antennas, wired, or wireless links as described above. For example, the transceiver 1120 may represent a wireless transceiver and may communicate bi-directionally with another wireless transceiver. The transceiver 1120 may also include a modem to modulate the packets and provide the modulated packets to the antennas for transmission, and to demodulate packets received from the antennas. In some cases, the device 1105 may include a single antenna 1125. However, in some cases, the device 1105 may have more than one antenna 1125, which may be capable of concurrently transmitting or receiving multiple wireless transmissions.

The memory 1130 may include RAM, ROM, or a combination thereof. The memory 1130 may store computer-readable code 1135 including instructions that, when executed by a processor (e.g., the processor 1140) cause the device to perform various functions described herein. In some cases, the memory 1130 may contain, among other things, a BIOS which may control basic hardware or software operation such as the interaction with peripheral components or devices.

The code 1135 may include instructions to implement aspects of the present disclosure, including instructions to support wireless communications. The code 1135 may be stored in a non-transitory computer-readable medium such as system memory or other type of memory. In some cases, the code 1135 may not be directly executable by the processor 1140 but may cause a computer (e.g., when compiled and executed) to perform functions described herein.

The processor 1140 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1140 may be configured to operate a memory array using a memory controller. In some cases, a memory controller may be integrated into processor 1140. The processor 1140 may be configured to execute computer-readable instructions stored in a memory (e.g., the memory 1130) to cause the device 1105 to perform various functions (e.g., functions or tasks supporting feedback error handling for wireless systems).

The inter-station communications manager 1145 may manage communications with other base station 105, and may include a controller or scheduler for controlling communications with UEs 115 in cooperation with other base stations 105. For example, the inter-station communications manager 1145 may coordinate scheduling for transmissions to UEs 115 for various interference mitigation techniques such as beamforming or joint transmission. In some examples, the inter-station communications manager 1145 may provide an X2 interface within an LTE/LTE-A wireless communication network technology to provide communication between base stations 105.

Figure 12:
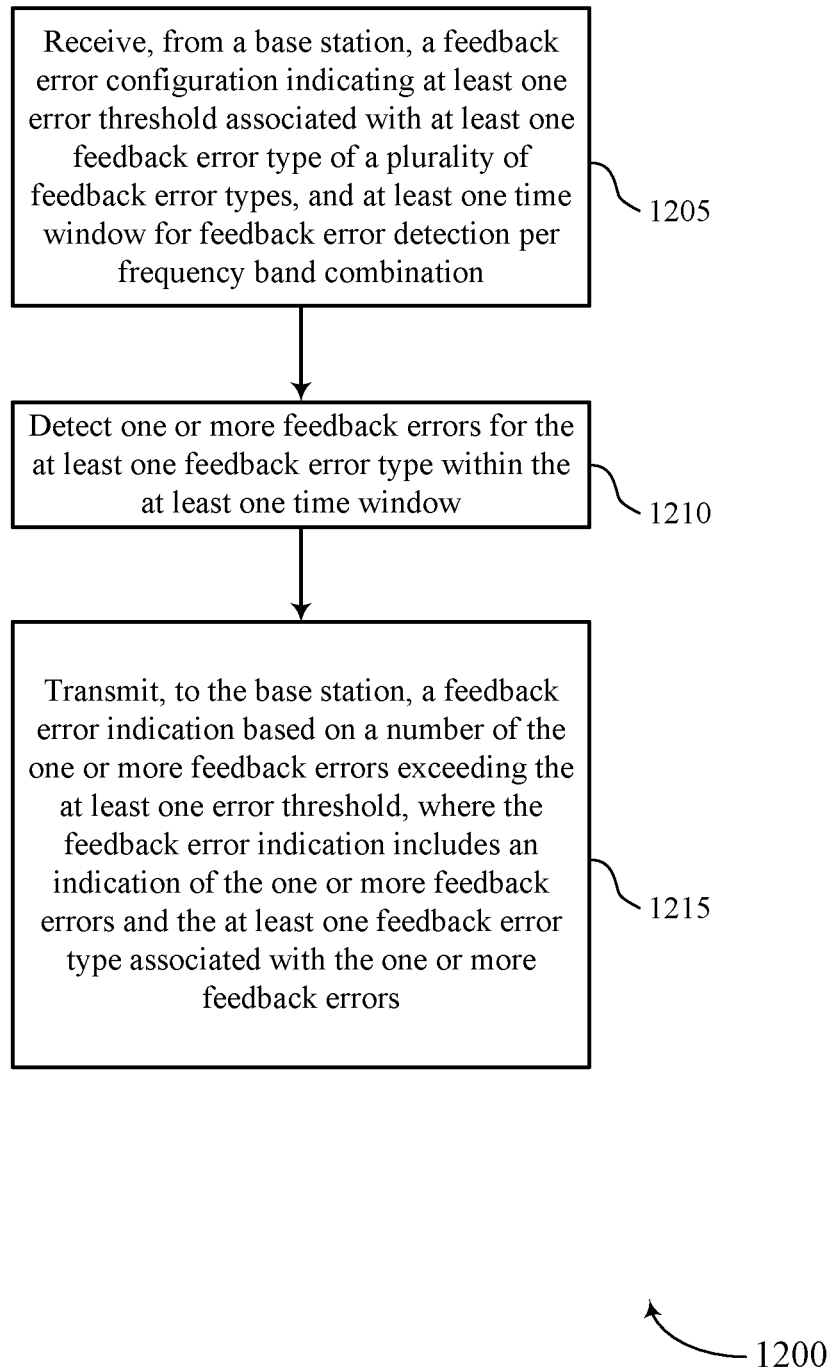
FIGS. 12 through 18 show flowcharts illustrating methods in accordance with aspects of the present disclosure.

FIG. 12 shows a flowchart illustrating a method 1200 in accordance with aspects of the present disclosure. The operations of method 1200 may be implemented by a UE or its components as described herein. For example, the operations of method 1200 may be performed by a UE communications manager as described with reference to FIGS. 4 through 7. In some examples, a UE may execute a set of instructions to control the functional elements of the UE to perform the functions described below. Additionally, or alternatively, a UE may perform aspects of the functions described below using special-purpose hardware.

At 1205, the UE may receive, from a base station, a feedback error configuration indicating at least one error threshold associated with at least one feedback error type of a plurality of feedback error types, and at least one time window for feedback error detection per frequency band combination. The operations of 1205 may be performed according to the methods described herein. In some examples, aspects of the operations of 1205 may be performed by a feedback error configuration component as described with reference to FIGS. 4 through 7.

At 1210, the UE may detect one or more feedback errors for the at least one feedback error type within the at least one time window. The operations of 1210 may be performed according to the methods described herein. In some examples, aspects of the operations of 1210 may be performed by a feedback error component as described with reference to FIGS. 4 through 7.

At 1215, the UE may transmit, to the base station, a feedback error indication based on a number of the one or more feedback errors exceeding the at least one error threshold, where the feedback error indication includes an indication of the one or more feedback errors and the at least one feedback error type associated with the one or more feedback errors. The operations of 1215 may be performed according to the methods described herein. In some examples, aspects of the operations of 1215 may be performed by a feedback error indicator component as described with reference to FIGS. 4 through 7.

Figure 13:
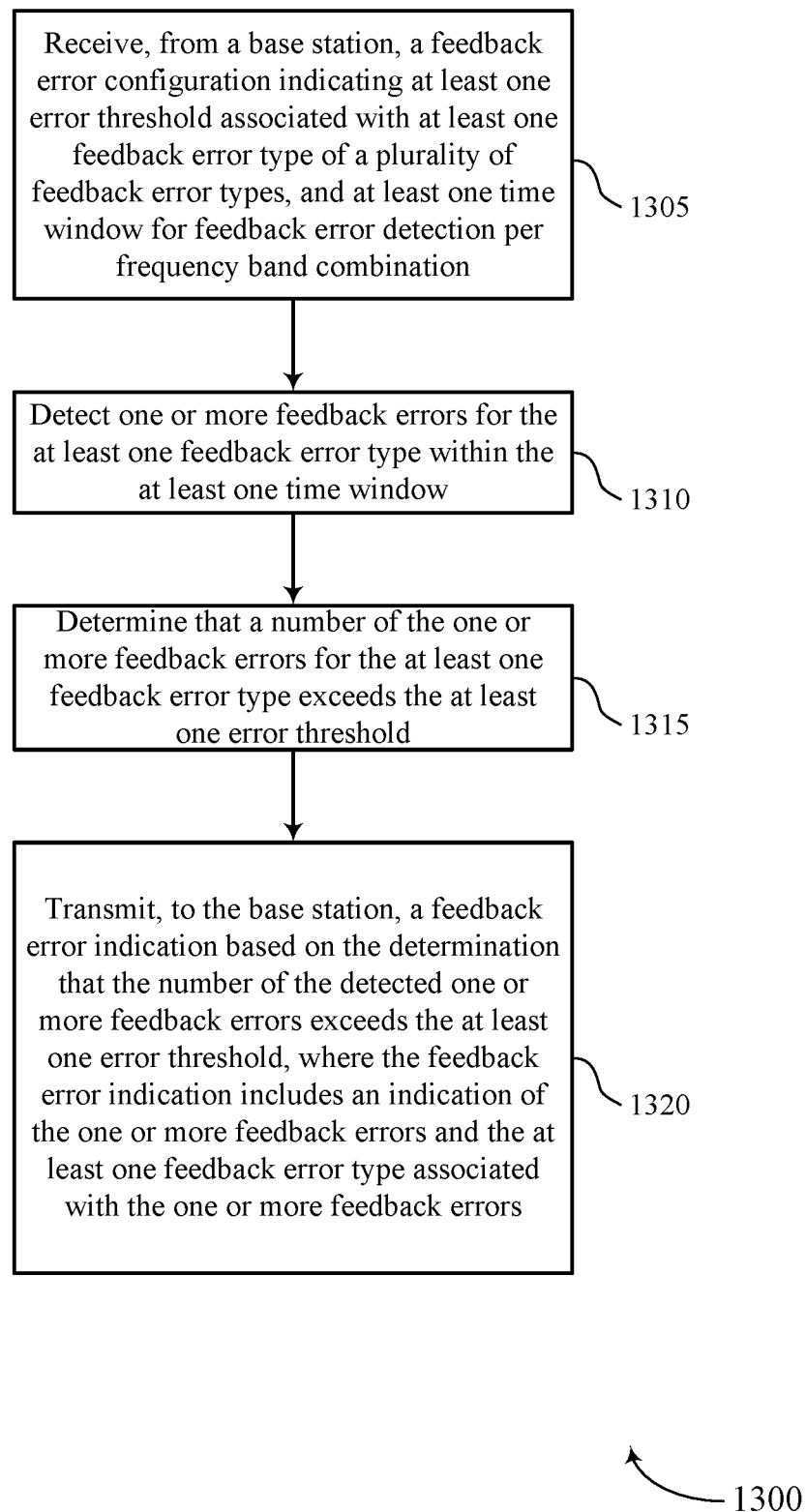

FIG. 13 shows a flowchart illustrating a method 1300 in accordance with aspects of the present disclosure. The operations of method 1300 may be implemented by a UE or its components as described herein. For example, the operations of method 1300 may be performed by a UE communications manager as described with reference to FIGS. 4 through 7. In some examples, a UE may execute a set of instructions to control the functional elements of the UE to perform the functions described below. Additionally, or alternatively, a UE may perform aspects of the functions described below using special-purpose hardware.

At 1305, the UE may receive, from a base station, a feedback error configuration indicating at least one error threshold associated with at least one feedback error type of a plurality of feedback error types, and at least one time window for feedback error detection per frequency band combination. The operations of 1305 may be performed according to the methods described herein. In some examples, aspects of the operations of 1305 may be performed by a feedback error configuration component as described with reference to FIGS. 4 through 7.

At 1310, the UE may detect one or more feedback errors for the at least one feedback error type within the at least one time window. The operations of 1310 may be performed according to the methods described herein. In some examples, aspects of the operations of 1310 may be performed by a feedback error component as described with reference to FIGS. 4 through 7.

At 1315, the UE may determine that a number of the one or more feedback errors for the at least one feedback error type exceeds the at least one error threshold. The operations of 1315 may be performed according to the methods described herein. In some examples, aspects of the operations of 1315 may be performed by a feedback error component as described with reference to FIGS. 4 through 7.

At 1320, the UE may transmit, to the base station, a feedback error indication based on the determination that the number of the detected one or more feedback errors exceeds the at least one error threshold, where the feedback error indication includes an indication of the one or more feedback errors and the at least one feedback error type associated with the one or more feedback errors. The operations of 1320 may be performed according to the methods described herein. In some examples, aspects of the operations of 1320 may be performed by a feedback error indicator component as described with reference to FIGS. 4 through 7.

Figure 14:
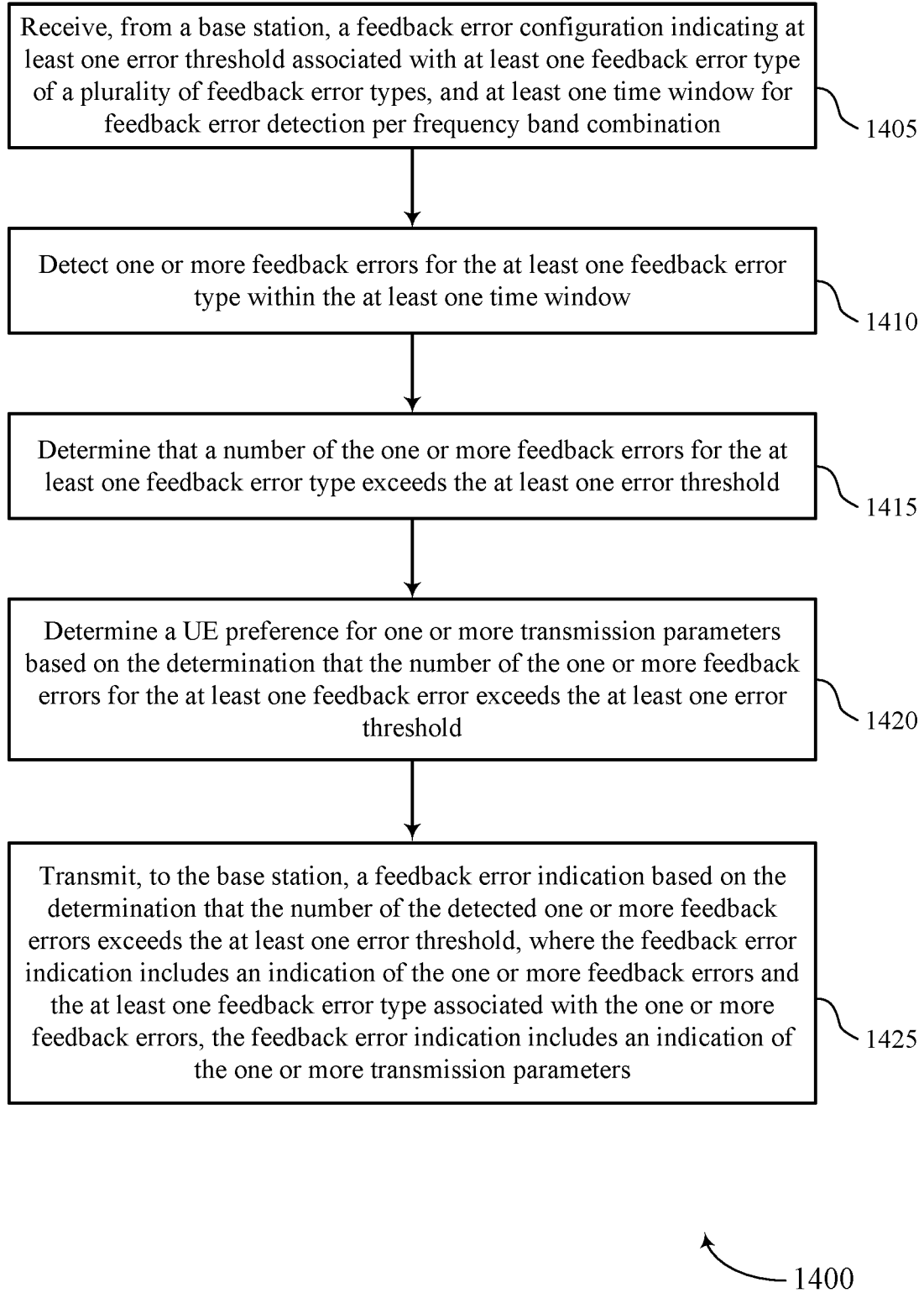

FIG. 14 shows a flowchart illustrating a method 1400 in accordance with aspects of the present disclosure. The operations of method 1400 may be implemented by a UE or its components as described herein. For example, the operations of method 1400 may be performed by a UE communications manager as described with reference to FIGS. 4 through 7. In some examples, a UE may execute a set of instructions to control the functional elements of the UE to perform the functions described below. Additionally, or alternatively, a UE may perform aspects of the functions described below using special-purpose hardware.

At 1405, the UE may receive, from a base station, a feedback error configuration indicating at least one error threshold associated with at least one feedback error type of a plurality of feedback error types, and at least one time window for feedback error detection per frequency band combination. The operations of 1405 may be performed according to the methods described herein. In some examples, aspects of the operations of 1405 may be performed by a feedback error configuration component as described with reference to FIGS. 4 through 7.

At 1410, the UE may detect one or more feedback errors for the at least one feedback error type within the at least one time window. The operations of 1410 may be performed according to the methods described herein. In some examples, aspects of the operations of 1410 may be performed by a feedback error component as described with reference to FIGS. 4 through 7.

At 1415, the UE may determine that a number of the one or more feedback errors for the at least one feedback error type exceeds the at least one error threshold. The operations of 1415 may be performed according to the methods described herein. In some examples, aspects of the operations of 1415 may be performed by a feedback error component as described with reference to FIGS. 4 through 7.

At 1420, the UE may determine a UE preference for one or more transmission parameters based on the determination that the number of the one or more feedback errors for the at least one feedback error type exceeds the at least one error threshold. The operations of 1420 may be performed according to the methods described herein. In some examples, aspects of the operations of 1420 may be performed by a parameter component as described with reference to FIGS. 4 through 7.

At 1425, the UE may transmit, to the base station, a feedback error indication based on the determination that the number of the detected one or more feedback errors exceeds the at least one error threshold, where the feedback error indication includes an indication of the one or more feedback errors and the at least one feedback error type associated with the one or more feedback errors, the feedback error indication includes an indication of the one or more transmission parameters. The operations of 1425 may be performed according to the methods described herein. In some examples, aspects of the operations of 1425 may be performed by a feedback error indicator component as described with reference to FIGS. 4 through 7.

Figure 15:
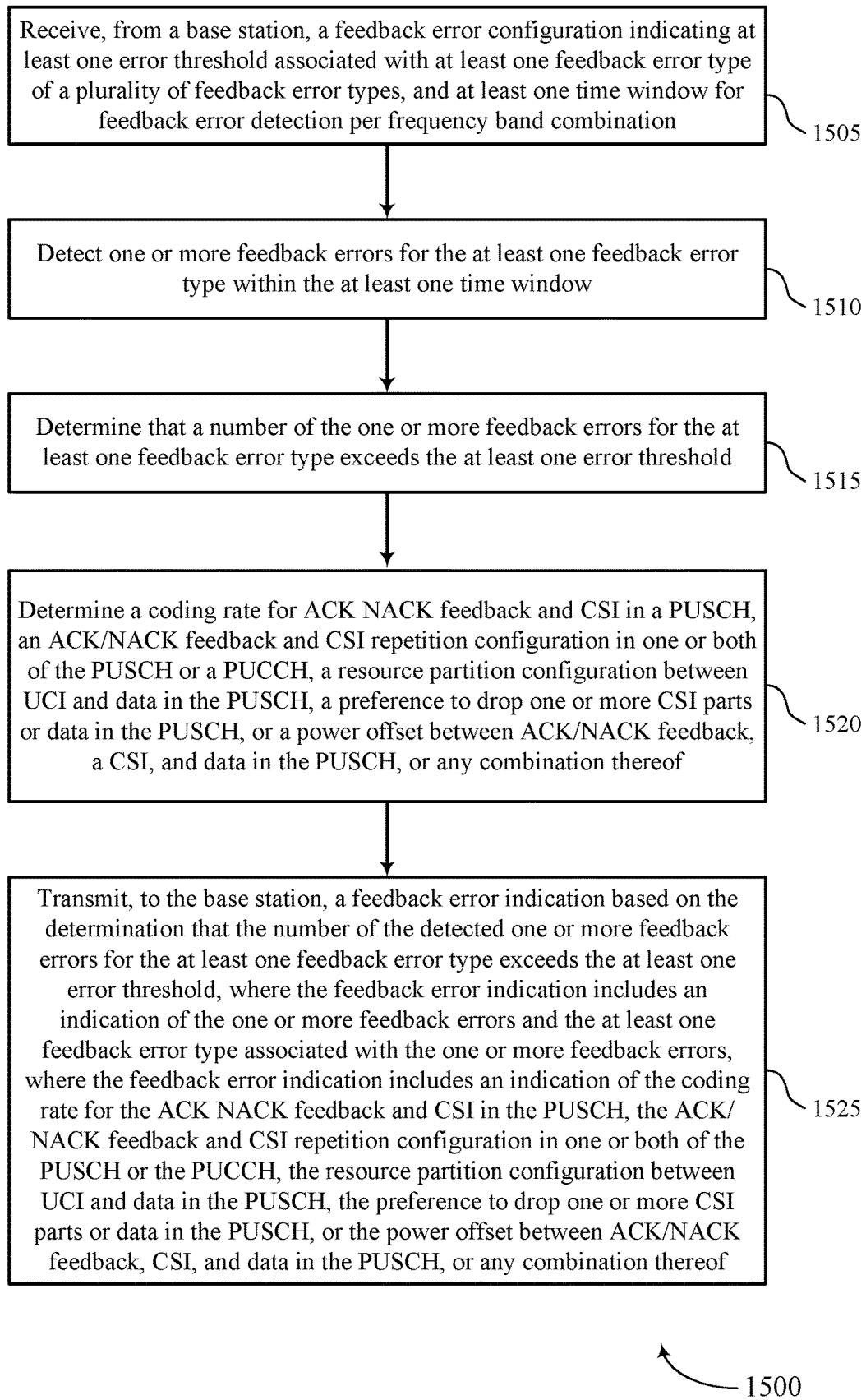

FIG. 15 shows a flowchart illustrating a method 1500 in accordance with aspects of the present disclosure. The operations of method 1500 may be implemented by a UE or its components as described herein. For example, the operations of method 1500 may be performed by a UE communications manager as described with reference to FIGS. 4 through 7. In some examples, a UE may execute a set of instructions to control the functional elements of the UE to perform the functions described below. Additionally, or alternatively, a UE may perform aspects of the functions described below using special-purpose hardware.

At 1505, the UE may receive, from a base station, a feedback error configuration indicating at least one error threshold associated with at least one feedback error type of a plurality of feedback error types, and at least one time window for feedback error detection per frequency band combination. The operations of 1505 may be performed according to the methods described herein. In some examples, aspects of the operations of 1505 may be performed by a feedback error configuration component as described with reference to FIGS. 4 through 7.

At 1510, the UE may detect one or more feedback errors for the at least one feedback error type within the at least one time window. The operations of 1510 may be performed according to the methods described herein. In some examples, aspects of the operations of 1510 may be performed by a feedback error component as described with reference to FIGS. 4 through 7.

At 1515, the UE may determine that a number of the one or more feedback errors for the at least one feedback error type exceeds the at least one error threshold. The operations of 1515 may be performed according to the methods described herein. In some examples, aspects of the operations of 1515 may be performed by a feedback error component as described with reference to FIGS. 4 through 7.

At 1520, the UE may determine a coding rate for ACK NACK feedback and CSI in a PUSCH, an ACK/NACK feedback and CSI repetition configuration in one or both of the PUSCH or a PUCCH, a resource partition configuration between UCI and data in a PUCCH, a preference to drop one or more CSI parts or data in the PUSCH, or a power offset between ACK/NACK feedback, a CSI, and data in the PUSCH, or any combination thereof. The operations of 1520 may be performed according to the methods described herein. In some examples, aspects of the operations of 1520 may be performed by a parameter component as described with reference to FIGS. 4 through 7.

At 1525, the UE may transmit, to the base station, a feedback error indication based on the determination that the number of the detected one or more feedback errors for the at least one feedback error type exceeds the at least one error threshold, where the feedback error indication includes an indication of the one or more feedback errors and the at least one feedback error type associated with the one or more feedback errors, where the feedback error indication includes an indication of the coding rate for the ACK NACK feedback and CSI in the PUSCH, the ACK/NACK feedback and CSI repetition configuration in one or both of the PUSCH or the PUCCH, the resource partition configuration between UCI and data in the PUCCH, the preference to drop one or more CSI parts or data in the PUCCH, or the power offset between ACK/NACK feedback, CSI, and data in the PUSCH, or any combination thereof. The operations of 1525 may be performed according to the methods described herein. In some examples, aspects of the operations of 1525 may be performed by a feedback error indicator component as described with reference to FIGS. 4 through 7.

Figure 16:
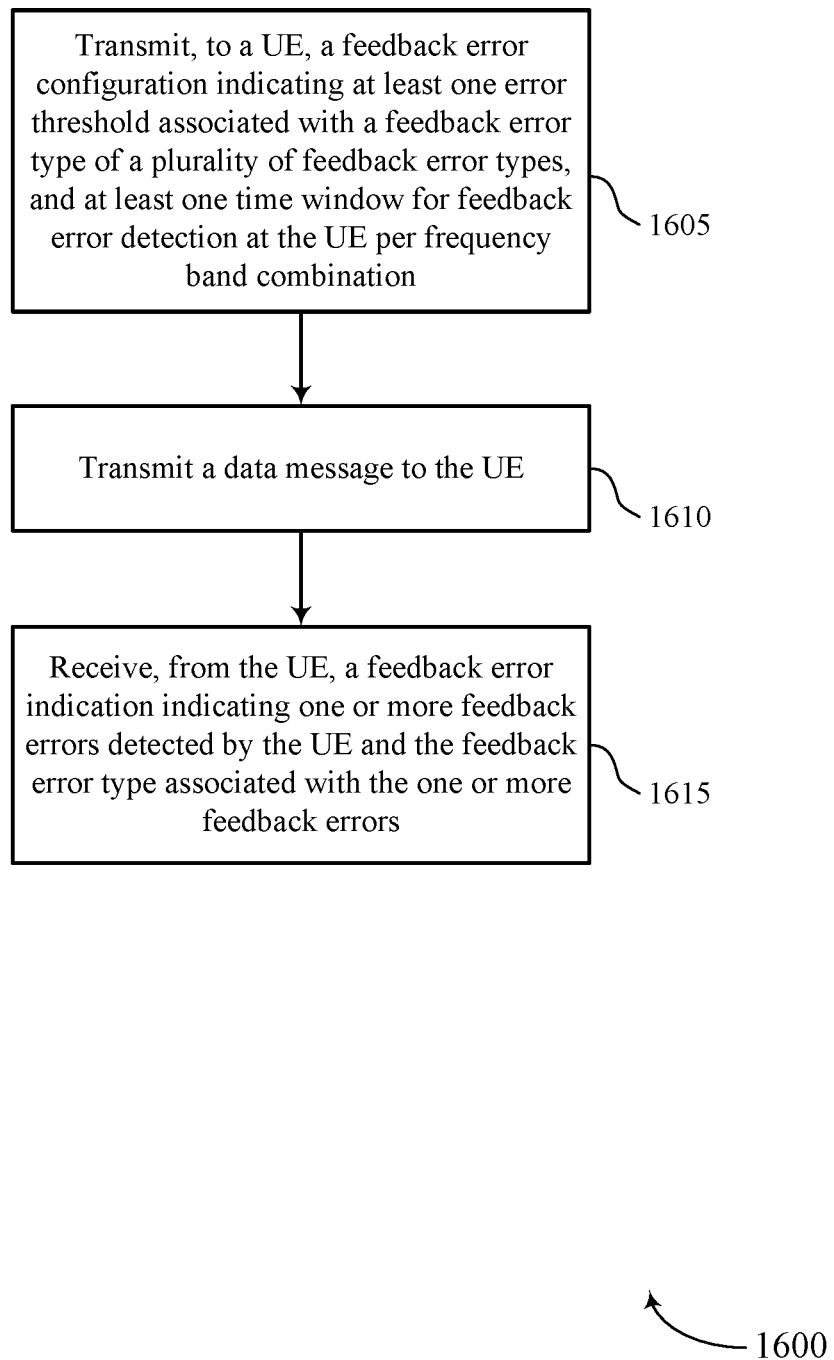

FIG. 16 shows a flowchart illustrating a method 1600 in accordance with aspects of the present disclosure. The operations of method 1600 may be implemented by a base station or its components as described herein. For example, the operations of method 1600 may be performed by a base station communications manager as described with reference to FIGS. 8 through 11. In some examples, a base station may execute a set of instructions to control the functional elements of the base station to perform the functions described below. Additionally, or alternatively, a base station may perform aspects of the functions described below using special-purpose hardware.

At 1605, the base station may transmit, to a UE, a feedback error configuration indicating at least one error threshold associated with a feedback error type of a plurality of feedback error types associated with a feedback error type of a plurality of feedback error types and at least one time window for feedback error detection at the UE per frequency band combination. The operations of 1605 may be performed according to the methods described herein. In some examples, aspects of the operations of 1605 may be performed by a feedback error configuration component as described with reference to FIGS. 8 through 11.

At 1610, the base station may transmit a data message to the UE. The operations of 1610 may be performed according to the methods described herein. In some examples, aspects of the operations of 1610 may be performed by a feedback message component as described with reference to FIGS. 8 through 11.

At 1615, the base station may receive, from the UE, a feedback error indication indicating one or more feedback errors detected by the UE and the feedback error type associated with the one or more feedback errors. The base station may receive the feedback error indication in response to, or based in part on, transmitting the data message. The operations of 1615 may be performed according to the methods described herein. In some examples, aspects of the operations of 1615 may be performed by a feedback error indicator component as described with reference to FIGS. 8 through 11.

Figure 17:
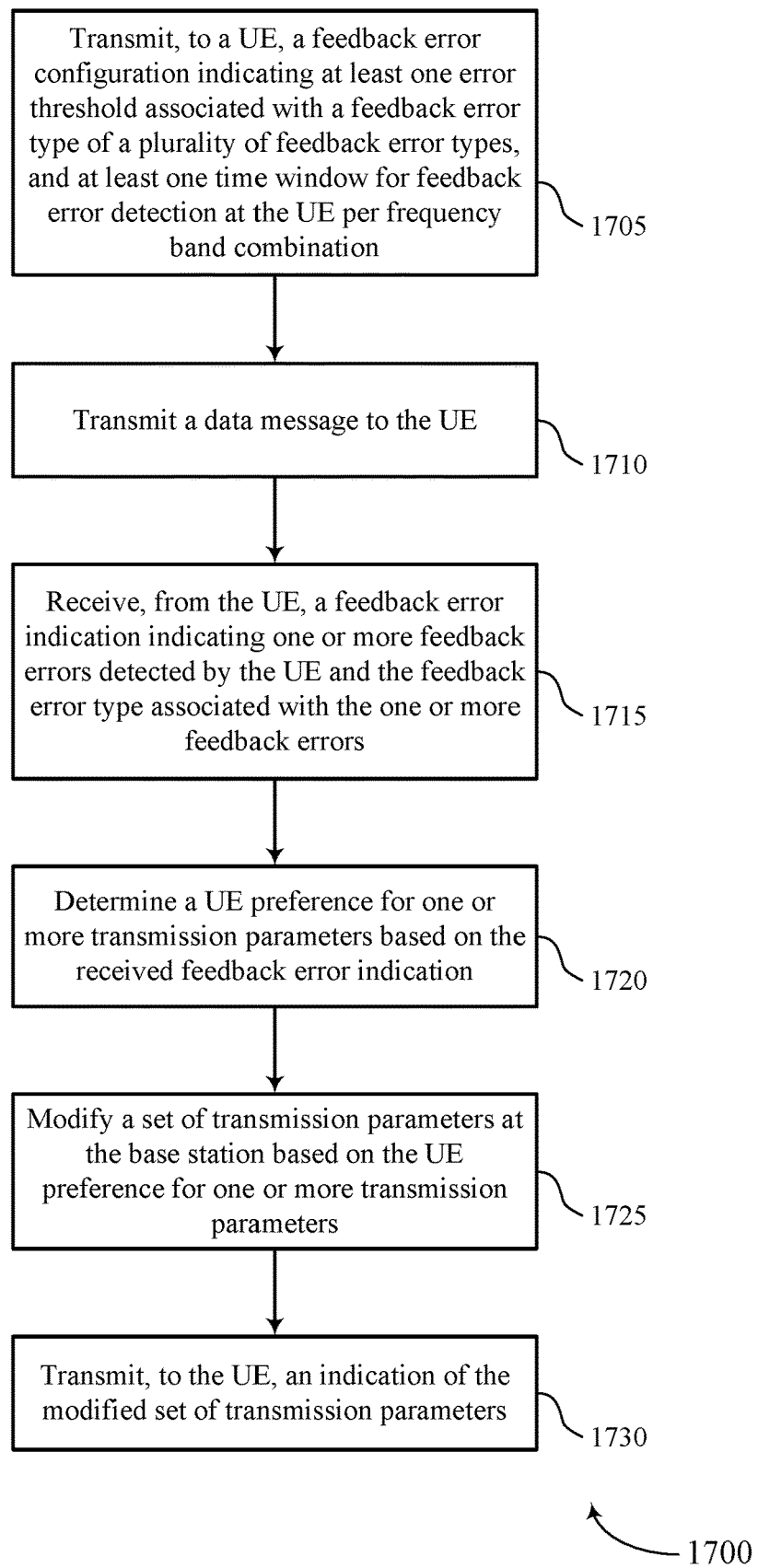

FIG. 17 shows a flowchart illustrating a method 1700 in accordance with aspects of the present disclosure. The operations of method 1700 may be implemented by a base station or its components as described herein. For example, the operations of method 1700 may be performed by a base station communications manager as described with reference to FIGS. 8 through 11. In some examples, a base station may execute a set of instructions to control the functional elements of the base station to perform the functions described below. Additionally, or alternatively, a base station may perform aspects of the functions described below using special-purpose hardware.

At 1705, the base station may transmit, to a UE, a feedback error configuration indicating at least one error threshold associated with a feedback error type of a plurality of feedback error types and at least one time window for feedback error detection at the UE per frequency band combination. The operations of 1705 may be performed according to the methods described herein. In some examples, aspects of the operations of 1705 may be performed by a feedback error configuration component as described with reference to FIGS. 8 through 11.

At 1710, the base station may transmit a data message to the UE. The operations of 1710 may be performed according to the methods described herein. In some examples, aspects of the operations of 1710 may be performed by a feedback message component as described with reference to FIGS. 8 through 11.

At 1715, the base station may receive, from the UE, a feedback error indication indicating one or more feedback errors detected by the UE and the feedback error type associated with the one or more feedback errors. The base station may receive the feedback error indication in response to, or based in part on, transmitting the data message. The operations of 1715 may be performed according to the methods described herein. In some examples, aspects of the operations of 1715 may be performed by a feedback error indicator component as described with reference to FIGS. 8 through 11.

At 1720, the base station may determine a UE preference for one or more transmission parameters based on the received feedback error indication. The operations of 1720 may be performed according to the methods described herein. In some examples, aspects of the operations of 1720 may be performed by a parameter component as described with reference to FIGS. 8 through 11.

At 1725, the base station may modify a set of transmission parameters at the base station based on the UE preference for one or more transmission parameters. The operations of 1725 may be performed according to the methods described herein. In some examples, aspects of the operations of 1725 may be performed by a parameter component as described with reference to FIGS. 8 through 11.

At 1730, the base station may transmit, to the UE, an indication of the modified set of transmission parameters. The operations of 1730 may be performed according to the methods described herein. In some examples, aspects of the operations of 1730 may be performed by a parameter component as described with reference to FIGS. 8 through 11.

Figure 18:
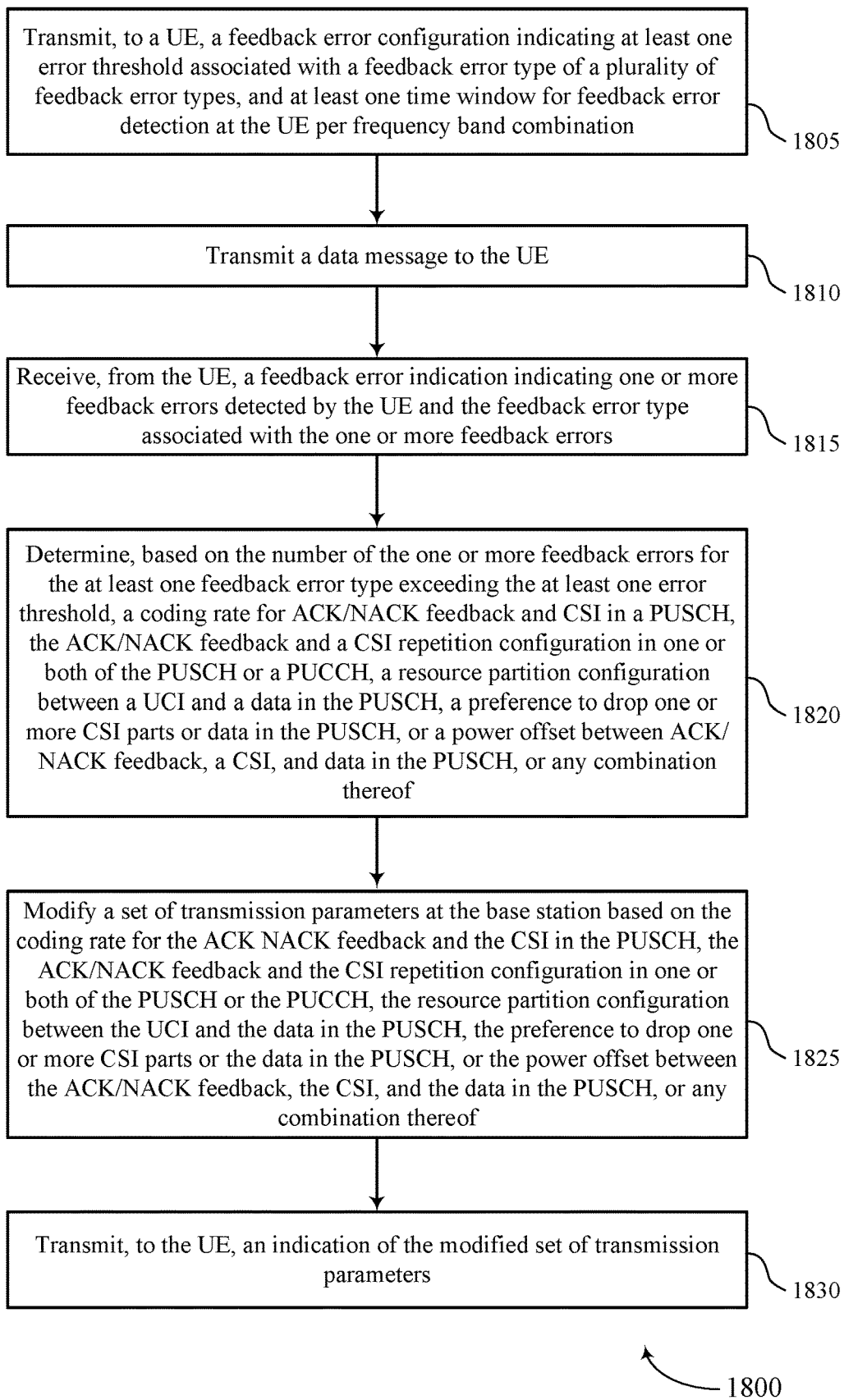

FIG. 18 shows a flowchart illustrating a method 1800 in accordance with aspects of the present disclosure. The operations of method 1800 may be implemented by a base station or its components as described herein. For example, the operations of method 1800 may be performed by a base station communications manager as described with reference to FIGS. 8 through 11. In some examples, a base station may execute a set of instructions to control the functional elements of the base station to perform the functions described below. Additionally, or alternatively, a base station may perform aspects of the functions described below using special-purpose hardware.

At 1805, the base station may transmit, to a UE, a feedback error configuration indicating at least one error threshold associated with a feedback error type of a plurality of feedback error types and at least one time window for feedback error detection at the UE per frequency band combination. The operations of 1805 may be performed according to the methods described herein. In some examples, aspects of the operations of 1805 may be performed by a feedback error configuration component as described with reference to FIGS. 8 through 11.

At 1810, the base station may transmit a data message to the UE. The operations of 1810 may be performed according to the methods described herein. In some examples, aspects of the operations of 1810 may be performed by a feedback message component as described with reference to FIGS. 8 through 11.

At 1815, the base station may receive, from the UE, a feedback error indication indicating one or more feedback errors detected by the UE and the feedback error type associated with the one or more feedback errors. The base station may receive the feedback error indication in response to, or based in part on, transmitting the data message. The operations of 1815 may be performed according to the methods described herein. In some examples, aspects of the operations of 1815 may be performed by a feedback error indicator component as described with reference to FIGS. 8 through 11.

At 1820, the base station may determine, based on the number of the one or more feedback errors for the at least one feedback error type exceeding the at least one error threshold, a coding rate for ACK/NACK feedback and CSI in a PUSCH, the ACK/NACK feedback and CSI repetition configuration in one or both of the PUSCH or a PUCCH, a resource partition configuration between a UCI and a data in the PUSCH, a preference to drop one or more CSI parts or the data in the PUSCH, or a power offset between the ACK/NACK feedback, the CSI, and the data in the PUSCH, or any combination thereof. The operations of 1820 may be performed according to the methods described herein. In some examples, aspects of the operations of 1820 may be performed by a parameter component as described with reference to FIGS. 8 through 11.

At 1825, the base station may modify a set of transmission parameters at the base station based on the coding rate for the ACK NACK feedback and the CSI in the PUSCH, the ACK/NACK feedback and CSI repetition configuration in one or both of the PUSCH or the PUCCH, the resource partition configuration between the UCI and the data in the PUSCH, the preference to drop one or more CSI parts or the data in the PUSCH, or the power offset between the ACK/NACK feedback, the CSI, and the data in the PUSCH, or any combination thereof. The operations of 1825 may be performed according to the methods described herein. In some examples, aspects of the operations of 1825 may be performed by a parameter component as described with reference to FIGS. 8 through 11.

At 1830, the base station may transmit, to the UE, an indication of the modified set of transmission parameters. The operations of 1830 may be performed according to the methods described herein. In some examples, aspects of the operations of 1830 may be performed by a parameter component as described with reference to FIGS. 8 through 11.

It should be noted that the methods described herein describe possible implementations, and that the operations and the steps may be rearranged or otherwise modified and that other implementations are possible. Further, aspects from two or more of the methods may be combined.

The following provides an overview of aspects of the present disclosure:

Aspect 1: A method for wireless communications at a UE, comprising: receiving, from a base station, a feedback error configuration indicating at least one error threshold associated with at least one feedback error type of a plurality of feedback error types and at least one time window for feedback error detection per frequency band combination; detecting one or more feedback errors for the at least one feedback error type within the at least one time window; and transmitting, to the base station, a feedback error indication based at least in part on a number of the one or more feedback errors exceeding the at least one error threshold, wherein the feedback error indication comprises an indication of the one or more feedback errors and the at least one feedback error type associated with the one or more feedback errors.

Aspect 2: The method of aspect 1, further comprising: determining a UE preference for one or more transmission parameters based at least in part on the number of the one or more feedback errors for the at least one feedback error type exceeding the at least one error threshold, wherein the feedback error indication comprises an indication of the one or more transmission parameters.

Aspect 3: The method of aspect 2, wherein determining the UE preference for one or more transmission parameters comprises: determining a coding rate for NACK feedback and CSI in an PUSCH, an ACK/NACK feedback and CSI repetition configuration in one or both of the PUSCH or a PUCCH, a resource partition configuration between UCI and data in the PUSCH, a preference to drop one or more CSI parts or data in the PUSCH, or a power offset between ACK/NACK feedback, a CSI, and data in the PUSCH, or any combination thereof.

Aspect 4: The method of any of aspects 1 through 3, further comprising: transmitting an acknowledgment feedback message based at least in part on a successful reception of a data transmission; and receiving a retransmission of the data transmission after transmitting the acknowledgment feedback message within the at least one time window, wherein the one or more feedback errors for the at least one feedback error type are detected based at least in part on the received retransmission of the data transmission in response to the transmitted acknowledgment feedback message.

Aspect 5: The method of aspect 4, further comprising: determining that the at least one feedback error type associated with the one or more feedback errors is an acknowledgment to negative acknowledgment error based at least in part on the received retransmission of the data transmission in response to the transmitted acknowledgment feedback message.

Aspect 6: The method of any of aspects 1 through 5, further comprising: transmitting a negative acknowledgment feedback message based at least in part on an unsuccessful reception of a first data transmission; and receiving, after transmitting the negative acknowledgment feedback message, a second data transmission different from the first data transmission within the at least one time window, wherein the one or more feedback errors for the at least one feedback error type are detected based at least in part on the received second data transmission in response to the transmitted negative acknowledgment feedback message.

Aspect 7: The method of aspect 6, further comprising: determining that the at least one feedback error type associated with the one or more feedback errors is a negative acknowledgment to acknowledgment error based at least in part on the received second data transmission in response to the transmitted negative acknowledgment feedback message.

Aspect 8: The method of any of aspects 1 through 7, wherein transmitting the feedback error indication comprises: transmitting the feedback error indication semi-statically based at least in part on the at least one feedback error type comprising an acknowledgment to negative acknowledgment error.

Aspect 9: The method of aspect 8, wherein transmitting the feedback error indication semi-statically comprises: transmitting the feedback error indication via RRC signaling.

Aspect 10: The method of any of aspects 1 through 9, wherein transmitting the feedback error indication comprises: transmitting the feedback error indication dynamically based at least in part on the feedback error type comprising a negative acknowledgment to acknowledgment error.

Aspect 11: The method of aspect 10, wherein transmitting the feedback error indication dynamically comprises: transmitting the feedback error indication via a CSI or a MAC-CE, or both.

Aspect 12: The method of any of aspects 1 through 11, further comprising: determining a first error threshold for a first feedback error type and a second error threshold for a second feedback error type based at least in part on the feedback error configuration, wherein the feedback error indication indicates the first feedback error type based at least in part on the one or more feedback errors being associated with the first feedback error type and the number of the one or more feedback errors exceeding the first error threshold or the feedback error indication indicating the second feedback error type based at least in part on the one or more feedback errors being associated with the second feedback error type and the number of the one or more feedback errors exceeding the second error threshold.

Aspect 13: The method of aspect 12, wherein the first feedback error type comprises an acknowledgment to negative acknowledgment error type and the second feedback error type comprises a negative acknowledgment to acknowledgment error type; and the first error threshold is greater than the second error threshold.

Aspect 14: The method of any of aspects 1 through 13, wherein receiving the feedback error configuration comprises: receiving the feedback error configuration per frequency band combination via RRC signaling.

Aspect 15: The method of any of aspects 1 through 14, wherein transmitting the feedback error indication comprises: transmitting the feedback error indication via a RRC signaling, a medium access control-control element signaling, or a channel state information, or any combination thereof.

Aspect 16: The method of any of aspects 1 through 15, further comprising: receiving a reconfiguration message that indicates a resource partition change or a power offset modification, or both, in response to the transmitted feedback error indication.

Aspect 17: A method for wireless communications at a base station, comprising: transmitting, to a UE, a feedback error configuration indicating at least one error threshold associated with a feedback error type of a plurality of feedback error types and at least one time window for feedback error detection at the UE; transmitting a data message to the UE; and receiving, from the UE, a feedback error indication indicating one or more feedback errors detected by the UE and the feedback error type associated with the one or more feedback errors.

Aspect 18: The method of aspect 17, further comprising: determining that the feedback error type associated with the one or more feedback errors is an acknowledgment to negative acknowledgment error based at least in part on the feedback error indication; modifying one or more transmission parameters at the base station based at least in part on the feedback error type comprising the acknowledgment to negative acknowledgment error; and transmitting, to the UE, a second data transmission based at least in part on the modified one or more transmission parameters.

Aspect 19: The method of any of aspects 17 through 18, further comprising: determining that the feedback error type associated with the one or more feedback errors is a negative acknowledgment to acknowledgment error based at least in part on the feedback error indication; and transmitting a retransmission of the data transmission to the UE based at least in part on the feedback error type comprising the negative acknowledgment to acknowledgment error.

Aspect 20: the method of any of aspects 17 through 19, further comprising: determining a UE preference for one or more transmission parameters based at least in part on the received feedback error indication; modifying a set of transmission parameters at the base station based at least in part on the UE preference for one or more transmission parameters; and transmitting, to the UE, an indication of the modified set of transmission parameters.

Aspect 21: The method of aspect 20, wherein determining the UE preference for the one or more transmission parameters comprises: determining a coding rate for NACK feedback and CSI in an PUSCH, an ACK/NACK feedback and CSI repetition configuration in one or both of the PUSCH or a PUCCH, a resource partition configuration between UCI and data in the PUSCH, a preference to drop one or more CSI parts or data in the PUSCH, or a power offset between ACK/NACK feedback, a CSI, and data in the PUSCH, or any combination thereof.

Aspect 22: The method of any of aspects 17 through 21, further comprising: modifying a set of transmission parameters at the base station based at least in part on the feedback error indication, wherein the set of transmission parameters comprises a resource partition or a power offset, or both; and transmitting a reconfiguration message that indicates a resource partition change, a power offset modification, or any combination thereof based at least in part on the modifying.

Aspect 23: The method of any of aspects 17 through 22, wherein receiving the feedback error indication comprises: receiving the feedback error indication semi-statically based at least in part on the feedback error type being a negative acknowledgment to acknowledgment error.

Aspect 24: The method of aspect 23, wherein the feedback error indication is received via RRC signaling.

Aspect 25: The method of any of aspects 17 through 24, wherein receiving the feedback error indication comprises: receiving the feedback error indication dynamically based at least in part on the feedback error type being a negative acknowledgment to acknowledgment error.

Aspect 26: The method of aspect 25, wherein the feedback error indication is received via a CSI or a MAC-CE, or both.

Aspect 27: The method of any of aspects 17 through 26, further comprising: determining a first error threshold for a first feedback error type and a second error threshold for a second feedback error type based at least in part on the feedback error configuration, wherein the feedback error configuration comprises the first error threshold and the second error threshold.

Aspect 28: The method of aspect 27, wherein the feedback error indication indicates the first feedback error type based at least in part on the one or more feedback errors being associated with the first feedback error type and a number of the one or more feedback errors exceeding the first error threshold or the feedback error indication indicates the second feedback error type based at least in part on the one or more feedback errors being associated with the second feedback error type and the number of the one or more feedback errors exceeding the second error threshold.

Aspect 29: The method of any of aspects 27 through 28, wherein the first feedback error type comprises an acknowledgment to negative acknowledgment error type and the second feedback error type comprises a negative acknowledgment to acknowledgment error type; and the first error threshold is greater than the second error threshold.

Aspect 30: The method of any of aspects 17 through 29, wherein transmitting the feedback error configuration comprises: transmitting the feedback error configuration via radio resource control signaling.

Aspect 31: An apparatus for wireless communications at a UE, comprising a processor; memory coupled with the processor; and instructions stored in the memory and executable by the processor to cause the apparatus to perform a method of any of aspects 1 through 16.

Aspect 32: An apparatus for wireless communications at a UE, comprising at least one means for performing a method of any of aspects 1 through 16.

Aspect 33: A non-transitory computer-readable medium storing code for wireless communications at a UE, the code comprising instructions executable by a processor to perform a method of any of aspects 1 through 16.

Aspect 34: An apparatus for wireless communications at a base station, comprising a processor; memory coupled with the processor; and instructions stored in the memory and executable by the processor to cause the apparatus to perform a method of any of aspects 17 through 30.

Aspect 35: An apparatus for wireless communications at a base station, comprising at least one means for performing a method of any of aspects 17 through 30.

Aspect 36: A non-transitory computer-readable medium storing code for wireless communications at a base station, the code comprising instructions executable by a processor to perform a method of any of aspects 17 through 30.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. An apparatus for wireless communications, comprising:
   a processor,
   memory coupled with the processor; and
   instructions stored in the memory and executable by the processor to cause the apparatus to:
      receive, from a base station, a feedback error configuration indicating at least one error threshold associated with at least one feedback error type of a plurality of feedback error types and at least one time window for feedback error detection per frequency band combination;
      detect one or more feedback errors for the at least one feedback error type within the at least one time window; and
      transmit, to the base station, a feedback error indication based at least in part on a number of the one or more feedback errors exceeding the at least one error threshold, wherein the feedback error indication comprises an indication of the one or more feedback errors and the at least one feedback error type associated with the one or more feedback errors.

2. The apparatus of claim 1, wherein the instructions are further executable by the processor to cause the apparatus to:
   determine a UE preference for one or more transmission parameters based at least in part on the number of the one or more feedback errors for the at least one feedback error type exceeding the at least one error threshold, wherein the feedback error indication comprises an indication of the one or more transmission parameters.

3. The apparatus of claim 2, wherein the instructions to determine the UE preference for one or more transmission parameters are further executable by the processor to cause the apparatus to:
   determine a coding rate for acknowledgment (ACK) negative ACK (NACK) feedback and channel station information (CSI) in a physical uplink shared channel (PUSCH), an ACK/NACK feedback and CSI repetition configuration in one or both of the PUSCH or a physical uplink control channel (PUCCH), a resource partition configuration between uplink control information (UCI) and data in the PUSCH, a preference to drop one or more CSI parts or data in the PUSCH, or a power offset between ACK/NACK feedback, a CSI, and data in the PUSCH, or any combination thereof.

4. The apparatus of claim 1, wherein the instructions are further executable by the processor to cause the apparatus to:

transmit an acknowledgment feedback message based at least in part on a successful reception of a data transmission; and receive a retransmission of the data transmission after transmitting the acknowledgment feedback message within the at least one time window, wherein the one or more feedback errors for the at least one feedback error type are detected based at least in part on the received retransmission of the data transmission in response to the transmitted acknowledgment feedback message.

5. The apparatus of claim 4, wherein the instructions are further executable by the processor to cause the apparatus to:
determine that the at least one feedback error type associated with the one or more feedback errors is an acknowledgment to negative acknowledgment error based at least in part on the received retransmission of the data transmission in response to the transmitted acknowledgment feedback message.

6. The apparatus of claim 1, wherein the instructions are further executable by the processor to cause the apparatus to:
transmit a negative acknowledgment feedback message based at least in part on an unsuccessful reception of a first data transmission; and
receive, after transmitting the negative acknowledgment feedback message, a second data transmission different from the first data transmission within the at least one time window, wherein the one or more feedback errors for the at least one feedback error type are detected based at least in part on the received second data transmission in response to the transmitted negative acknowledgment feedback message.

7. The apparatus of claim 6, wherein the instructions are further executable by the processor to cause the apparatus to:
determine that the at least one feedback error type associated with the one or more feedback errors is a negative acknowledgment to acknowledgment error based at least in part on the received second data transmission in response to the transmitted negative acknowledgment feedback message.

8. The apparatus of claim 1, wherein the instructions to transmit the feedback error indication are further executable by the processor to cause the apparatus to:
transmit the feedback error indication semi-statically via radio resource control signaling based at least in part on the at least one feedback error type comprising an acknowledgment to negative acknowledgment error.

9. The apparatus of claim 1, wherein the instructions to transmit the feedback error indication are further executable by the processor to cause the apparatus to:
transmit the feedback error indication dynamically via a channel state information (CSI) or a medium access control (MAC) control element (MAC-CE), or both based at least in part on the feedback error type comprising a negative acknowledgment to acknowledgment error.

10. The apparatus of claim 1, wherein the instructions are further executable by the processor to cause the apparatus to:
determine a first error threshold for a first feedback error type and a second error threshold for a second feedback error type based at least in part on the feedback error configuration, wherein the feedback error indication indicates the first feedback error type based at least in part on the one or more feedback errors being associated with the first feedback error type and the number of the one or more feedback errors exceeding the first error threshold or the feedback error indication indicating the second feedback error type based at least in part on the one or more feedback errors being associated with the second feedback error type and the number of the one or more feedback errors exceeding the second error threshold.

11. The apparatus of claim 10, wherein:
the first feedback error type comprises an acknowledgment to negative acknowledgment error type and the second feedback error type comprises a negative acknowledgment to acknowledgment error type; and
the first error threshold is greater than the second error threshold.

12. The apparatus of claim 1, wherein the instructions to receive the feedback error configuration are further executable by the processor to cause the apparatus to:
receive the feedback error configuration per frequency band combination via radio resource control signaling.

13. The apparatus of claim 1, wherein the instructions to transmit the feedback error indication are further executable by the processor to cause the apparatus to:
transmit the feedback error indication via a radio resource control signaling, a medium access control-control element signaling, or a channel state information, or any combination thereof.

14. The apparatus of claim 1, wherein the instructions are further executable by the processor to cause the apparatus to:
receive a reconfiguration message that indicates a resource partition change or a power offset modification, or both, in response to the transmitted feedback error indication.

15. An apparatus for wireless communications, comprising:
a processor,
memory coupled with the processor; and
instructions stored in the memory and executable by the processor to cause the apparatus to:
transmit, to a user equipment (UE), a feedback error configuration indicating at least one error threshold associated with a feedback error type of a plurality of feedback error types and at least one time window for feedback error detection at the UE;
transmit a data message to the UE; and
receive, from the UE, a feedback error indication indicating one or more feedback errors detected by the UE and the feedback error type associated with the one or more feedback errors.

16. The apparatus of claim 15, wherein the instructions are further executable by the processor to cause the apparatus to:
determine that the feedback error type associated with the one or more feedback errors is an acknowledgment to negative acknowledgment error based at least in part on the feedback error indication;
modify one or more transmission parameters at the apparatus based at least in part on the feedback error type comprising the acknowledgment to negative acknowledgment error; and
transmit, to the UE, a second data transmission based at least in part on the modified one or more transmission parameters.

17. The apparatus of claim 15, wherein the instructions are further executable by the processor to cause the apparatus to:
determine that the feedback error type associated with the one or more feedback errors is a negative acknowledgment to acknowledgment error based at least in part on the feedback error indication; and transmit a retransmission of the data transmission to the UE based at least in part on the feedback error type comprising the negative acknowledgment to acknowledgment error.

18. The apparatus of claim 15, wherein the instructions are further executable by the processor to cause the apparatus to:
   determine a UE preference for one or more transmission parameters based at least in part on the received feedback error indication;
   modify a set of transmission parameters at the apparatus based at least in part on the UE preference for one or more transmission parameters; and
   transmit, to the UE, an indication of the modified set of transmission parameters.

19. The apparatus of claim 18, wherein the instructions to determine the UE preference for the one or more transmission parameters are further executable by the processor to cause the apparatus to:
   determine a coding rate for acknowledgment (ACK) negative ACK (NACK) feedback and channel station information (CSI) in a physical uplink shared channel (PUSCH), an ACK/NACK feedback and CSI repetition configuration in one or both of the PUSCH or a physical uplink control channel (PUCCH), a resource partition configuration between uplink control information (UCI) and data in the PUSCH, a preference to drop one or more CSI parts or data in the PUSCH, or a power offset between ACK/NACK feedback, a CSI, and data in the PUSCH, or any combination thereof.

20. The apparatus of claim 15, wherein the instructions are further executable by the processor to cause the apparatus to:
   modify a set of transmission parameters at the apparatus based at least in part on the feedback error indication, wherein the set of transmission parameters comprises a resource partition or a power offset, or both; and
   transmit a reconfiguration message that indicates a resource partition change, a power offset modification, or any combination thereof based at least in part on the modifying.

21. The apparatus of claim 15, wherein the instructions to receive the feedback error indication are further executable by the processor to cause the apparatus to: receive the feedback error indication semi-statically based at least in part on the feedback error type being a negative acknowledgment to acknowledgment error, wherein the feedback error indication is received via radio resource control signaling.

22. The apparatus of claim 15, wherein the instructions to receive the feedback error indication are further executable by the processor to cause the apparatus to: receive the feedback error indication dynamically based at least in part on the feedback error type being a negative acknowledgment to acknowledgment error, wherein the feedback error indication is received via a channel state information (CSI) or a medium access control (MAC) control element (MAC-CE), or both.

23. The apparatus of claim 15, wherein the instructions are further executable by the processor to cause the apparatus to:
   determine a first error threshold for a first feedback error type and a second error threshold for a second feedback error type based at least in part on the feedback error configuration, wherein the feedback error configuration comprises the first error threshold and the second error threshold.

24. The apparatus of claim 23, wherein the feedback error indication indicates the first feedback error type based at least in part on the one or more feedback errors being associated with the first feedback error type and a number of the one or more feedback errors exceeding the first error threshold or the feedback error indication indicates the second feedback error type based at least in part on the one or more feedback errors being associated with the second feedback error type and the number of the one or more feedback errors exceeding the second error threshold.

25. The apparatus of claim 23, wherein:
   the first feedback error type comprises an acknowledgment to negative acknowledgment error type and the second feedback error type comprises a negative acknowledgment to acknowledgment error type; and
   the first error threshold is greater than the second error threshold.

26. The apparatus of claim 15, wherein the instructions to transmit the feedback error configuration are further executable by the processor to cause the apparatus to:
   transmit the feedback error configuration via radio resource control signaling.

27. A method for wireless communications at a user equipment (UE), comprising:
   receiving, from a base station, a feedback error configuration indicating at least one error threshold associated with at least one feedback error type of a plurality of feedback error types, and at least one time window for feedback error detection per frequency band combination;
   detecting one or more feedback errors for the at least one feedback error type within the at least one time window; and
   transmitting, to the base station, a feedback error indication based at least in part on a number of the one or more feedback errors exceeding the at least one error threshold, wherein the feedback error indication comprises an indication of the one or more feedback errors and the at least one feedback error type associated with the one or more feedback errors.

28. The method of claim 27, further comprising:
   determining a UE preference for one or more transmission parameters based at least in part on the number of the one or more feedback errors for the at least one feedback error type exceeding the at least one error threshold, wherein the feedback error indication comprises an indication of the one or more transmission parameters.

29. A method for wireless communications at a base station, comprising:
   transmitting, to a user equipment (UE), a feedback error configuration indicating at least one error threshold associated with a feedback error type of a plurality of feedback error types and at least one time window for feedback error detection at the UE per frequency band combination;
   transmitting a data message to the UE;
   and receiving, from the UE, a feedback error indication indicating one or more feedback errors detected by the UE and the feedback error type associated with the one or more feedback errors.

30. The method of claim 29, further comprising:
   determining that the feedback error type associated with the one or more feedback errors is an acknowledgment to negative acknowledgment error based at least in part on the feedback error indication;

modifying one or more transmission parameters at the base station based at least in part on the feedback error type comprising the acknowledgment to negative acknowledgment error; and transmitting, to the UE, a second data transmission based at least in part on the modified one or more transmission parameters.

\* \* \* \* \*